(12) United States Patent
Adra

(10) Patent No.: US 11,576,452 B2
(45) Date of Patent: Feb. 14, 2023

(54) SYSTEM AND METHOD TO SELECT WEARABLE ITEMS

(71) Applicant: CREATEASOFT, INC., Aurora, IL (US)

(72) Inventor: Hosni Adra, Naperville, IL (US)

( * ) Notice: Subject to any disclaimer, the term of this patent is extended or adjusted under 35 U.S.C. 154(b) by 302 days.

(21) Appl. No.: 16/897,864

(22) Filed: Jun. 10, 2020

(65) Prior Publication Data

US 2021/0386148 A1  Dec. 16, 2021

(51) Int. Cl.
  *A41H 1/02* (2006.01)
  *A41H 3/00* (2006.01)
  *G06T 7/73* (2017.01)
  *G06Q 30/0601* (2023.01)
  *G06V 40/10* (2022.01)

(52) U.S. Cl.
  CPC .............. *A41H 1/02* (2013.01); *A41H 3/007* (2013.01); *G06Q 30/0621* (2013.01); *G06T 7/74* (2017.01); *G06V 40/103* (2022.01); *G06T 2207/30196* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 8,643,641 | B2* | 2/2014 | Passmore | G06T 7/254 345/646 |
| 11,113,892 | B2* | 9/2021 | Rozenblit | G06T 19/006 |
| 2007/0074114 | A1* | 3/2007 | Adjali | G06F 3/01 715/706 |
| 2014/0282137 | A1* | 9/2014 | Lin | G06Q 30/0643 715/765 |
| 2016/0086500 | A1* | 3/2016 | Kaleal, III | A61B 5/43 434/257 |
| 2016/0180449 | A1* | 6/2016 | Naware | G06T 13/40 703/7 |
| 2017/0263031 | A1* | 9/2017 | Chaudhary | G06T 11/60 |
| 2020/0302378 | A1* | 9/2020 | Palaka | G06Q 10/06375 |

* cited by examiner

*Primary Examiner* — Dave Czekaj
*Assistant Examiner* — Shanika M Brumfield

(57) ABSTRACT

A computer-readable medium storing contents configured to cause a computing device to obtain image data describing a subject, measure the subject based on the obtained image data to obtain one or more spatial dimensions, and access data describing a wearable item based on the spatial dimensions of the subject.

27 Claims, 19 Drawing Sheets

SYSTEM AND METHOD TO SELECT WEARABLE ITEMS

BACKGROUND

The system to select wearable items generally relates to a system and method to select wearable items. More particularly, the system to select wearable items relates to a system and method that obtains image data of a subject, and analyzes the subject to select wearable items that will fit on the subject.

In order to select wearable items, a tailor obtains measurements of various parts of the subject's body. After receiving measurements from a tailor, the subject can identify and select wearable items that fit according to the measurements they have received.

DETAILED DESCRIPTION OF THE INVENTION

Figure 1:
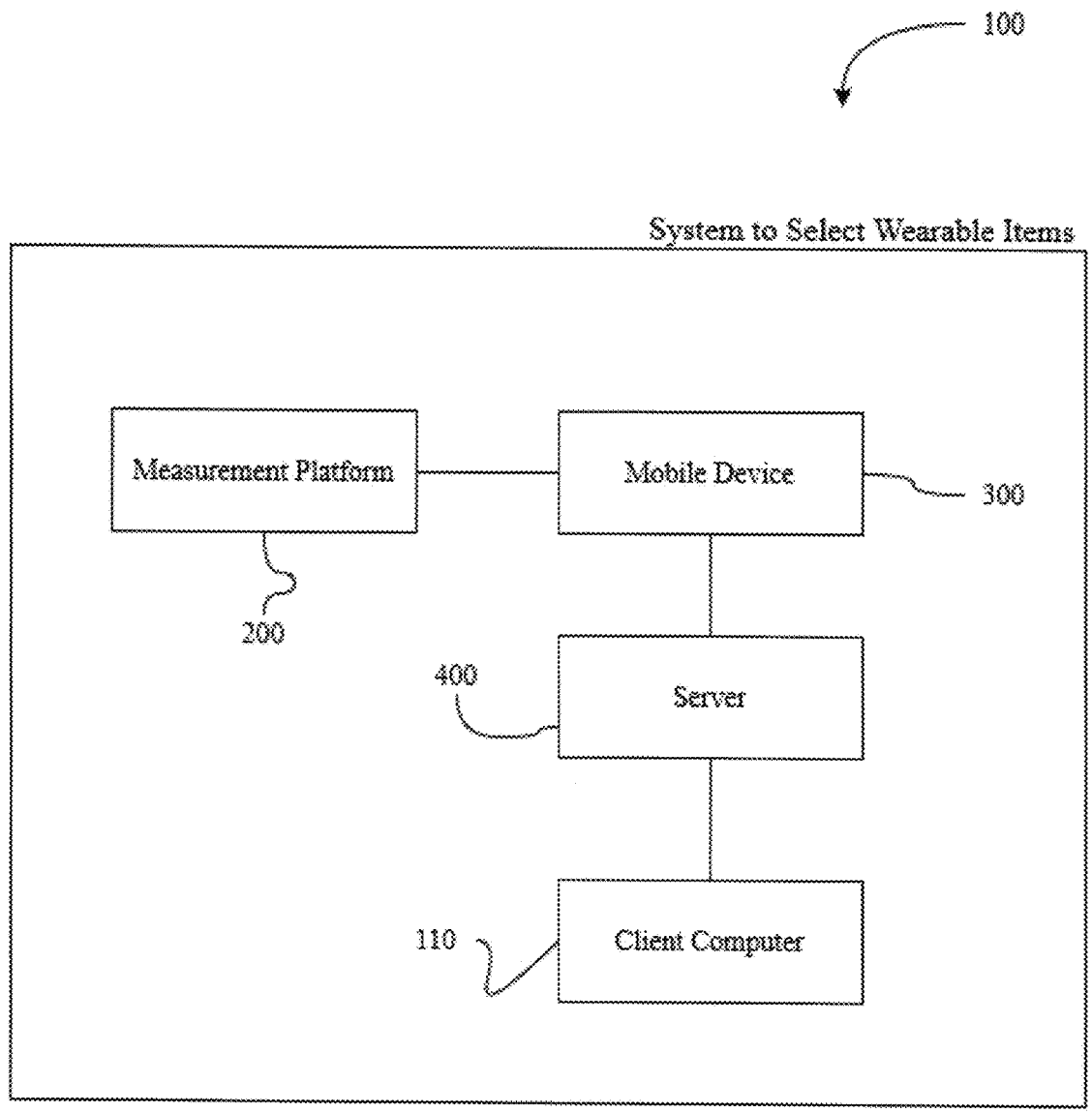
FIG. 1 illustrates a system to select wearable items according to an embodiment of the system to select wearable items.

In order to select wearable items that fit a subject properly, measurements of various parts of the subject are needed. In the case of a human subject, the subject will need to visit a tailor to obtain measurements of their body in order to select wearable items that fit them properly. After receiving measurements from a tailor, the subject can then look for and select wearable items that fit according to the measurements they have received.

Additionally, some manufacturers identify various predetermined sizes, such as small, medium, large, etc. A subject then knows their size and selects wearable items accordingly, or attempts to wear (i.e. "tries on") various wearable items sized by the manufacturer and determines which items best fit them.

The inventors have identified certain disadvantages with current methods of obtaining measurements of a subject and selecting items, such as, the methods being time intensive and prone to human error. When a tailor measures a subject, the tailor must measure every part of a subject required to fit clothes, a process that takes time and special skill on the part of the tailor. Additionally, some parts of the subject, such as arch length of the foot, the size of the fingers, etc., are not traditionally measured, and may require extra time and skill to properly measure. After the measurements are obtained, the subject must manually find wearable items, such as clothes, which fit the measurements provided by the tailor.

Additionally, clothing brands and manufacturers may label their products differently, for example, while two manufacturers may each label a shirt as medium, the first manufacturer may define a medium shirt to be 40 inches tall, while the second manufacturer may define a medium shirt to be 45 inches tall. Thus, even when a tailor does not give the subject precise measurements, the subject may still have trouble finding clothes that fit them properly and will need to spend even more time searching for clothes that properly fit.

Furthermore, existing methods to measure a subject and properly fitting wearable items requires the use of specialized computing devices that utilize sound waves or 3D images to measure the subject. These methods am resource intensive and require the use of specialized computer peripherals.

The inventors have recognized these disadvantages, and conceived and reduced to practice a system to select wearable items that is faster, less resource intensive, and provides measurements for more parts of a subject's body than traditional methods of selecting wearable items.

In some embodiments, the system to select wearable items alleviates the disadvantages present in existing methods to measure a subject and select wearable items and provides a quick and easy solution to measuring a subject by obtaining image data of a subject and analyzing that image data to provide accurate measurements of the subject. In some embodiments, the image data includes images of the subject in one or more poses. In some embodiments, the subject's identifying features, such as biometric data, are protected by obfuscating the features, such as by blurring the subject's features, creating a silhouette of the subject before analyzing the subject, etc. In some embodiments, where the subject is a person, and the system to select wearable items provides measurements such as height, head size, torso size, arm size, arm cuff size, hand size, leg size, thigh size, foot size, arch length and angle, leg cuff size, etc.

In some embodiments, the system to select wearable items searches a pre-populated database of wearable items and determines which wearable items best fit the subject based on the subject's measurements. In some embodiments, the system to select wearable items transmits or displays a list of wearable items that fit the subject based on the obtained measurements. In some embodiments, the database of wearable items includes measurements of the wearable items. In some embodiments, the system to select wearable items uses the database of wearable items to generate a list of wearable items that fit the subject properly based on the subject's measurements. In some embodiments, the database of wearable items also includes a range of measurements for each wearable item. In some embodiments, if the subject's measurements are within the range of measurements, the wearable item is included in the generated list of wearable items.

In some embodiments, the system to select wearable items generates one or more ellipses based on the subject's measurements, and utilizes the circumference of the ellipses to obtain a more accurate measurement of the subject. In some embodiments, the system to select wearable items utilizes the circumferences, major axes, minor axes, and other measurements or dimensions of the one or more ellipses to obtain a more accurate measurement of the subject. In some embodiments, the system to select wearable items displays a silhouette of the subject with ellipses placed on each body part measured. In some embodiments, the system to select wearable items obtains user input to determine whether the ellipses accurately measure one or more of the subject's body parts. In some embodiments, the system to select wearable items utilizes the user input to adjust the ellipses used to measure the subject.

In some embodiments, data describing the ellipses and the subject are stored in a database. In some embodiments, the system to select wearable items utilizes stored data describing the ellipses and the subject to better fit ellipses for future subjects. In some embodiments, the system to select wearable items obtains data describing the subject's body type, such as height, weight, body mass index, etc., to describe the subject.

In some embodiments, the system to select wearable items stores the data describing the subject along with the data describing the ellipses and the data describing the subject. In some embodiments, the system to select wearable items utilizes stored data describing prior subjects to predict which ellipses will best fit the subject. In some embodiments, the prediction of which ellipses best fit the subject is performed by using the data describing the subject's body type. In some embodiments, the prediction of which ellipses best fit the subject is improved over time by aggregating more data describing prior subjects.

The system to select wearable items improves the functionality of computing devices used to measure a subject by operating in a manner that utilizes fewer resources, such as primary memory, secondary memory, processing power, etc. The system to select wearable items improves the functionality of these computing devices by operating without specialized peripherals and by utilizing known patterns and traits, such as a subject's body type, observed in prior subjects.

FIG. 1 illustrates a system to select wearable items 100 according to an embodiment of the system to select wearable items. The system to select wearable items 100 includes a measurement platform 200, mobile device 300, a server 400, and a client computer 110. The measurement platform 200 is further discussed in FIG. 2. The mobile device 300 is further discussed in FIG. 3. The server 400 is further discussed in FIG. 4.

In the system to select wearable items 100, the mobile device 300 provides data to the server 400, such as image data and data describing the subject. The mobile device 300 receives data from the server 400, such as data describing the subject and configuration data. The server 400 provides data to the mobile device 300, such as data describing the subject and configuration data. The server 400 receives data from the mobile device 300, such as image data and data describing the subject. The server 400 provides data to the client computer 110, such as data describing a subject and a list of wearable items. The server 400 receives data from the client computer 110, such as data describing the subject and user input describing the subject's body type. The client computer 110 receives data from the server 400, such as data describing a subject and a list of wearable items. The client computer 110 provides data to the server 400, such as data describing the subject and user input describing the subject's body type.

In operation, a subject is placed on the measurement platform 200. The mobile device 300 is placed at a predetermined distance from the measurement platform 200 and obtains image data of the subject positioned on the measurement platform 200. The mobile device 300 transmits the image data to the server 400. The server 400 processes and analyzes the image data by using the processes described in FIGS. 7-11 and FIGS. 16-18, and transmits a list of spatial dimensions representing the subject's size to the client computer 110. In some embodiments, the server 400 transmits a list of wearable items that have been determined to fit the subject to the client computer 110.

In some embodiments, the mobile device 300 obfuscates the subject's biometric data before sending the image to the server 400. In some embodiments, the mobile device 300 enhances the image data before sending the image data to the server 400, such as by utilizing edge enhancement algorithms, color correction algorithms, sharpening, noise reduction, etc.

In some embodiments, the mobile device 300 also transmits additional data identifying the subject positioned on the platform, such as a name or pre-determined identification number, to the server 400.

In some embodiments, the server 400 compares the list of spatial dimensions generated to a set of stored spatial dimensions representing the spatial dimensions of a wearable item. The server 400 then compiles a list of wearable items that have spatial dimensions within a pre-determined range of the generated spatial dimensions. The server 400 then transmits the list of wearable items to the client computer 110.

In some embodiments, the server 400 transmits the list of spatial dimensions to the mobile device 300.

In some embodiments, the mobile device 300 transmits image data to the client computer 110. In some embodiments, the client computer 110 processes and analyzes the image data and generates a list of spatial dimensions representing the subject's size.

In some embodiments, the client computer 110 is a computer such as a personal computer, tablet computer, server, mobile device, microcontroller, or any other type of computing device. In some embodiments, data transmission between the mobile device 300, server 400, and the client computer 110, can be accomplished by storing data on a CD-ROM, DVD, USB drive, or other storage device or media, and then accessing the storage device at the mobile device 300, server 400, or client computer 110.

In some embodiments, the client computer 110 compares the generated list of spatial dimensions to a set of stored spatial dimensions representing the spatial dimensions of a wearable item. In some embodiments, the client computer 110 compiles a list of wearable items that have spatial dimensions within a pre-determined range of the generated spatial dimensions.

In some embodiments, the mobile device captures a single image of the subject positioned on the platform. In some embodiments, the mobile device captures multiple images of the subject positioned on the platform. In some embodiments, the mobile device captures multiple images of the subject positioned on the platform, wherein the subject positioned on the platform has a different pose in each image captured. In some embodiments, the mobile device captures multiple images of the subject positioned on the platform from different viewpoints.

In some embodiments, the mobile device captures the image of the subject positioned on the platform, generates a list of spatial dimensions representing the subject's size, compares the list of spatial dimensions representing the subject's size to a list of spatial dimensions representing a wearable item, and generates a list of wearable items which are within a pre-determined range of the spatial dimensions representing the subject's size.

In some embodiments in the case of layered clothing items, the list of generated wearable items utilizes data describing the thickness of each item and when determining the fit of a wearable item when worn with, over, under, etc., other wearable items.

Figure 2:
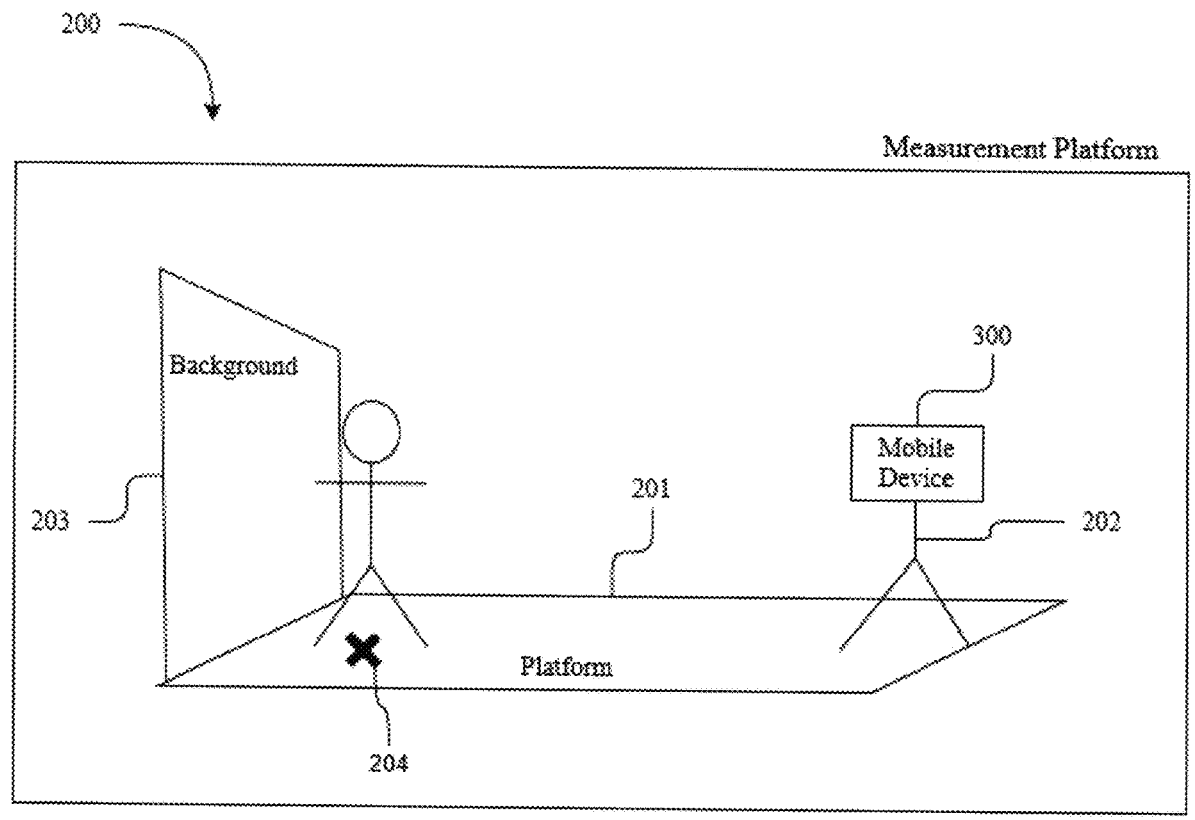
FIG. 2 illustrates a measurement platform according to an embodiment of the system to select wearable items.

FIG. 2 illustrates a measurement platform 200 according to an embodiment of the system to select wearable items. The measurement platform 200 includes a platform 201, a stand 202, a background 203, and a calibration mark 204.

In the measurement platform 200, the platform 201 is attached to the background 203. The stand 202 is placed on the platform 201 at a pre-determined distance away from the background 203. The background 203 contains markings spaced at pre-determined distances along its edges. The background 203 has a predetermined height and width. The platform 201 has a predetermined height and width. The background 203, stand 202, and calibration mark 204 are colored with predetermined colors, which can be the same color or different colors. A mobile device 300 is placed on the stand 202. The background 203 is positioned such that its markings are in view of the mobile device's 300 camera. The calibration mark 204 is a marking placed on the platform 201 at a predetermined distance between the mobile device 300 and the background 203.

In operation, if the distance between the stand 202 and the background 203 is unknown, it is measured. If the distance between the calibration mark 204 and the mobile device 300 is unknown, it is measured. A subject then is placed or positioned such that the subject is placed or positioned on top of the calibration mark 204. The mobile device 300 is placed on the stand 202 and captures pictures of the subject on the platform 201.

In some embodiments, the platform 201 is not included and the stand 202 and background 203 are placed at a pre-determined distance away from each other. In some embodiments, the background 203 is not attached to the platform 201. In some embodiments, the background 203 has no markings along its edges.

Figure 3:
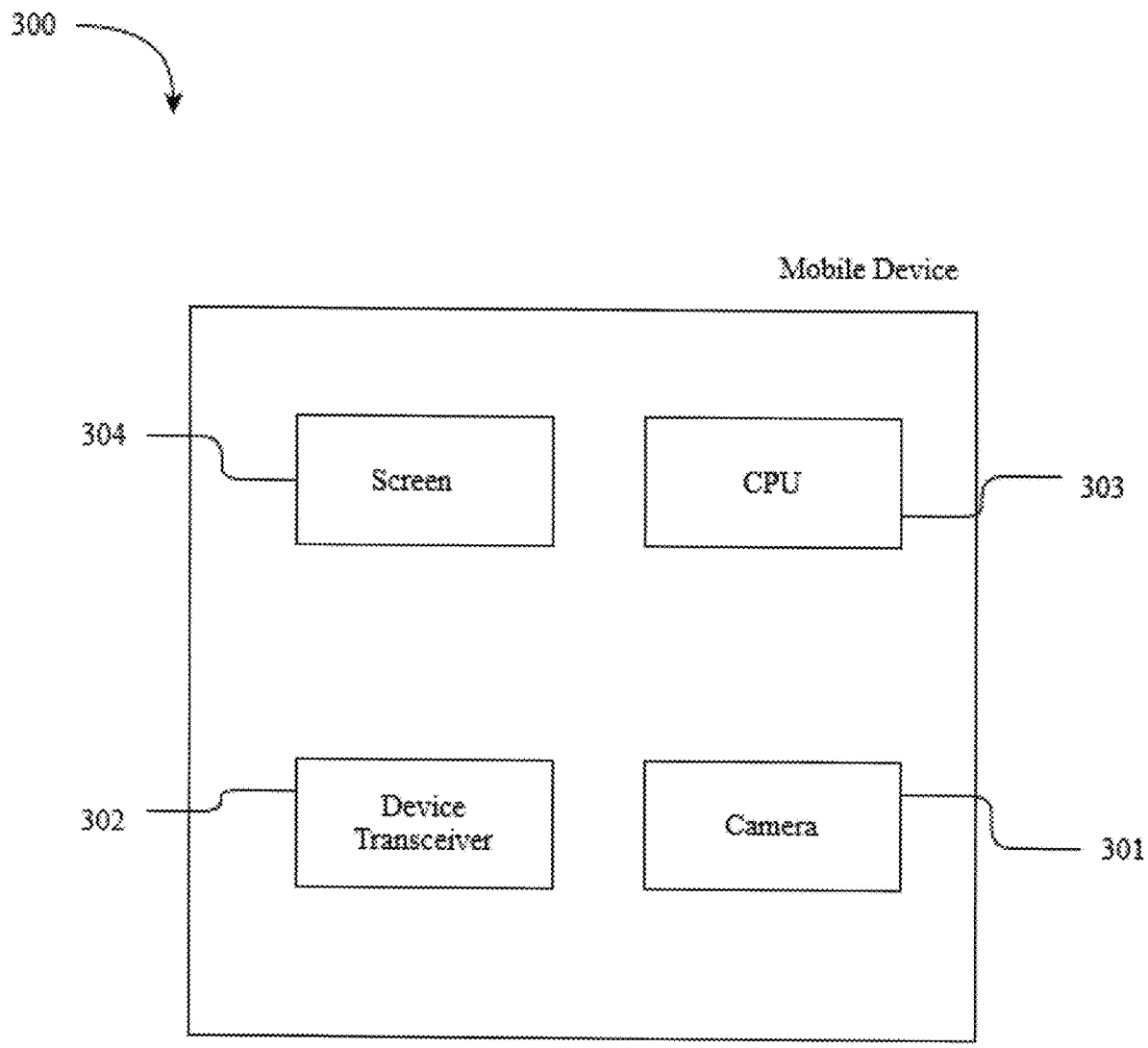
FIG. 3 illustrates a mobile device according to an embodiment of the system to select wearable items.

FIG. 3 illustrates a mobile device 300 according to an embodiment of the system to select wearable items. The mobile device 300 includes a camera 301, a device transceiver 302, a CPU 303, and a screen 304.

In the mobile device 300, the camera 301 is electronically connected to the mobile device 300. The device transceiver 302 is electronically connected to the mobile device 300. The CPU 303 is electronically connected to the mobile device 300. The screen 304 is electronically connected to the mobile device 300. The camera 301 is electronically connected to the CPU 303. The device transceiver 302 is electronically connected to the CPU 303. The screen 304 is electronically connected to the CPU 303.

In operation the camera 301 obtains image data of a subject. The camera 301 transmits image data to the device transceiver 302. The device transceiver 302 transmits the image data to another device, such as a server 400. The screen 304 displays prompts for user input. The mobile device 300 receives user input that is passed to the device transceiver 302. The device transceiver 302 transmits the user input to another device such as a server 400.

In some embodiments, the mobile device 300 includes a persistent memory storage and stores the images in the persistent memory storage before transmitting the data. In some embodiments, the mobile device 300 only includes a camera 301 and a removable storage media, the mobile device 300 stores image data on the removable storage media, then the removable storage media is accessed by another computer to retrieve the image data. In some embodiments, the mobile device 300 obfuscates a subject's biometric data, such as by creating a silhouette of the subject based on the image data, blurring the subject's features, removing the subject's features related to biometric data, etc.

Figure 4:
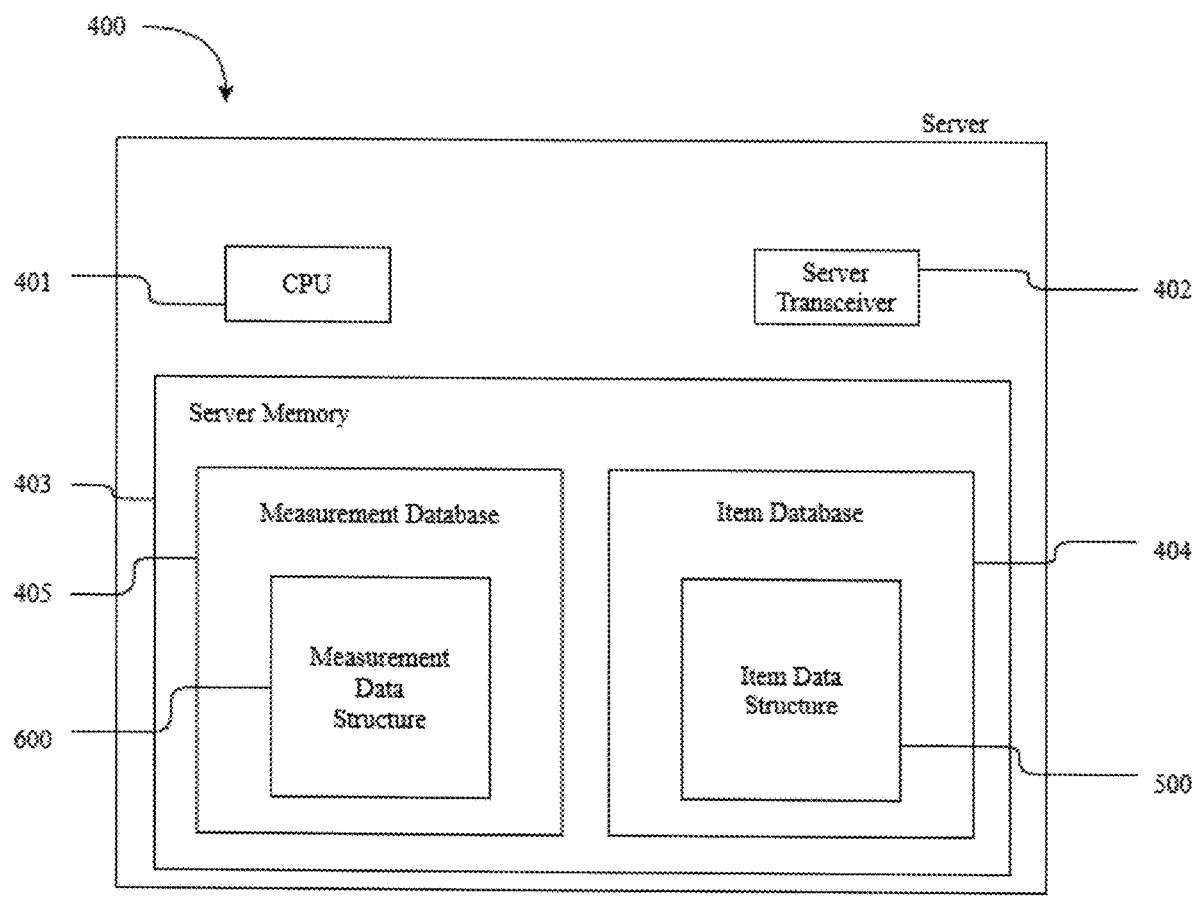
FIG. 4 illustrates a server according to an embodiment of the system to select wearable items.

FIG. 4 illustrates a server 400 according to an embodiment of the system to select wearable items. The server 400 includes a CPU 401, a server transceiver 402, a server memory 403. The server memory includes an item database 404, and a measurement database 405.

In the server 400 the CPU 401 is electronically connected to the server 400. The server transceiver 402 is electronically connected to the server 400. The server memory 403 is electronically connected to the server 400. The server memory 403 is electronically connected to the CPU 401. The server transceiver 402 is electronically connected to the CPU 401. The item database 404 is stored in the server memory 403. The measurement database 405 is stored in the Server Memory 403. The Item Database 404 stores item data structures 500, further discussed in FIG. 5. The measurement database 405 stores measurement data structures 600, further discussed in FIG. 6.

In operation, the server transceiver 402 receives data and transmits the data to the CPU 401. The CPU 401 transmits data to the server memory 403. The server memory 403 stores data in the item database 404. The server memory 403 stores data in the measurement database 405. The server memory 403 transmits data to the CPU 401. The CPU 401 manipulates and processes the data according to the methods disclosed in FIGS. 7-11 and FIGS. 16-18. The CPU 401 transmits data to the server transceiver 402. The server transceiver 402 transmits data to another device.

Figure 5:
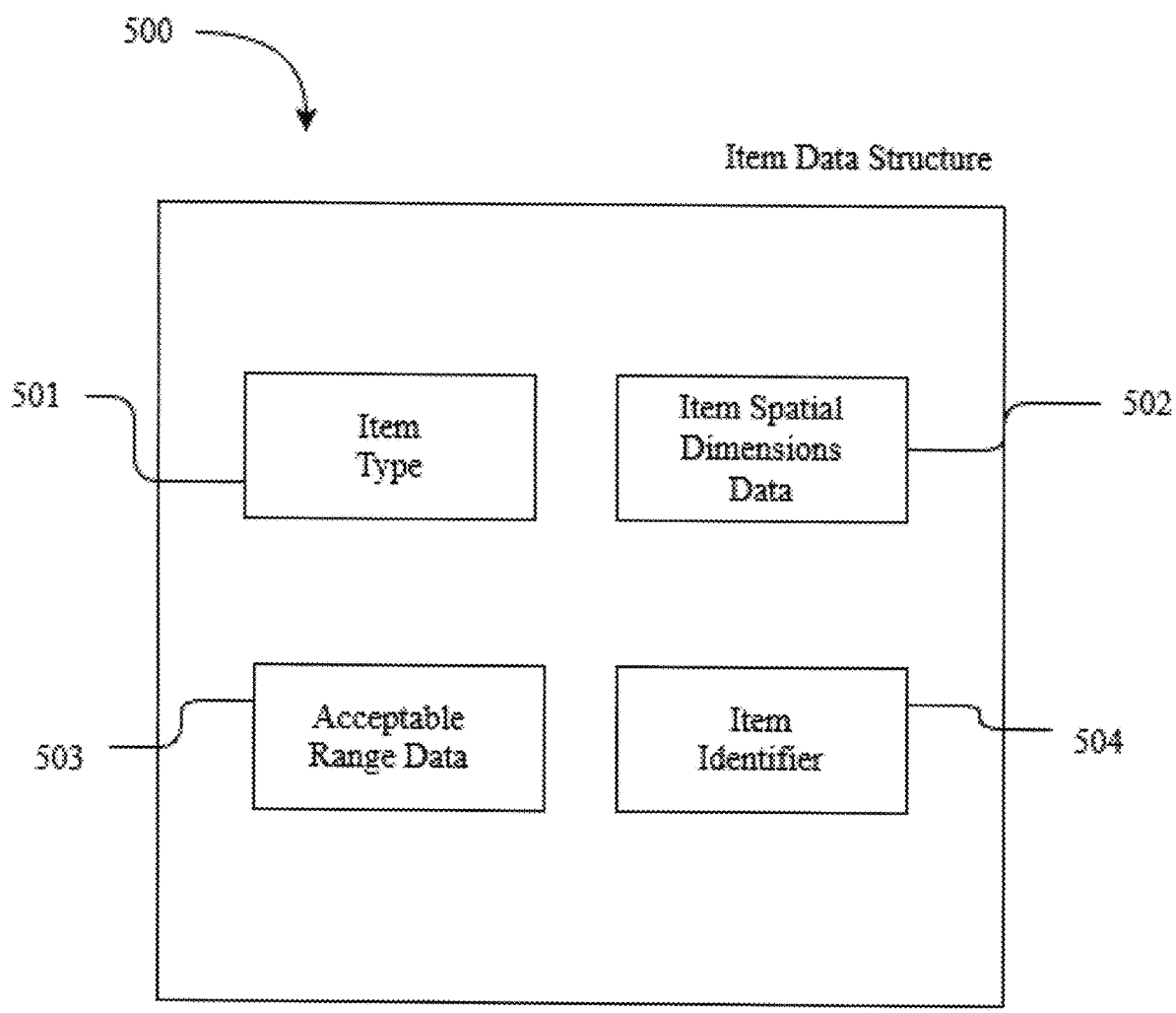
FIG. 5 depicts a sample item data structure according to an embodiment of the system to select wearable items.

FIG. 5 depicts a sample item data structure 500 according to an embodiment of the system to select wearable items. The item data structure 500 includes an item type 501, item spatial dimensions data 502, acceptable range data 503, and an item identifier 504. The item type 501 includes text data or numerical data representing the type of item the item data structure 500 represents. The item type 501 includes data describing the part of a subject that the item represented by the item data structure 500 is placed on, attached to, worn on, etc. The item spatial dimensions data 502 includes data describing the spatial dimensions of the item represented by the item data structure 500. In some embodiments, the item spatial dimensions data includes the length, width, diameter, and other data representing the spatial dimensions of the item. The acceptable range data 503 includes data describing a range of acceptable values used when comparing the item spatial dimensions data 502 to spatial dimensions stored in a measurement data structure 600. The item identifier 504 includes data describing the item. In some embodiments, the item identifier 504 includes an item name, product number, brand, or other data useful for differentiating the item from other items.

In some embodiments, the item data structure 500 includes data describing the item's manufacturer, brand name, color, or other attributes not related to the item's spatial dimensions.

Figure 6:
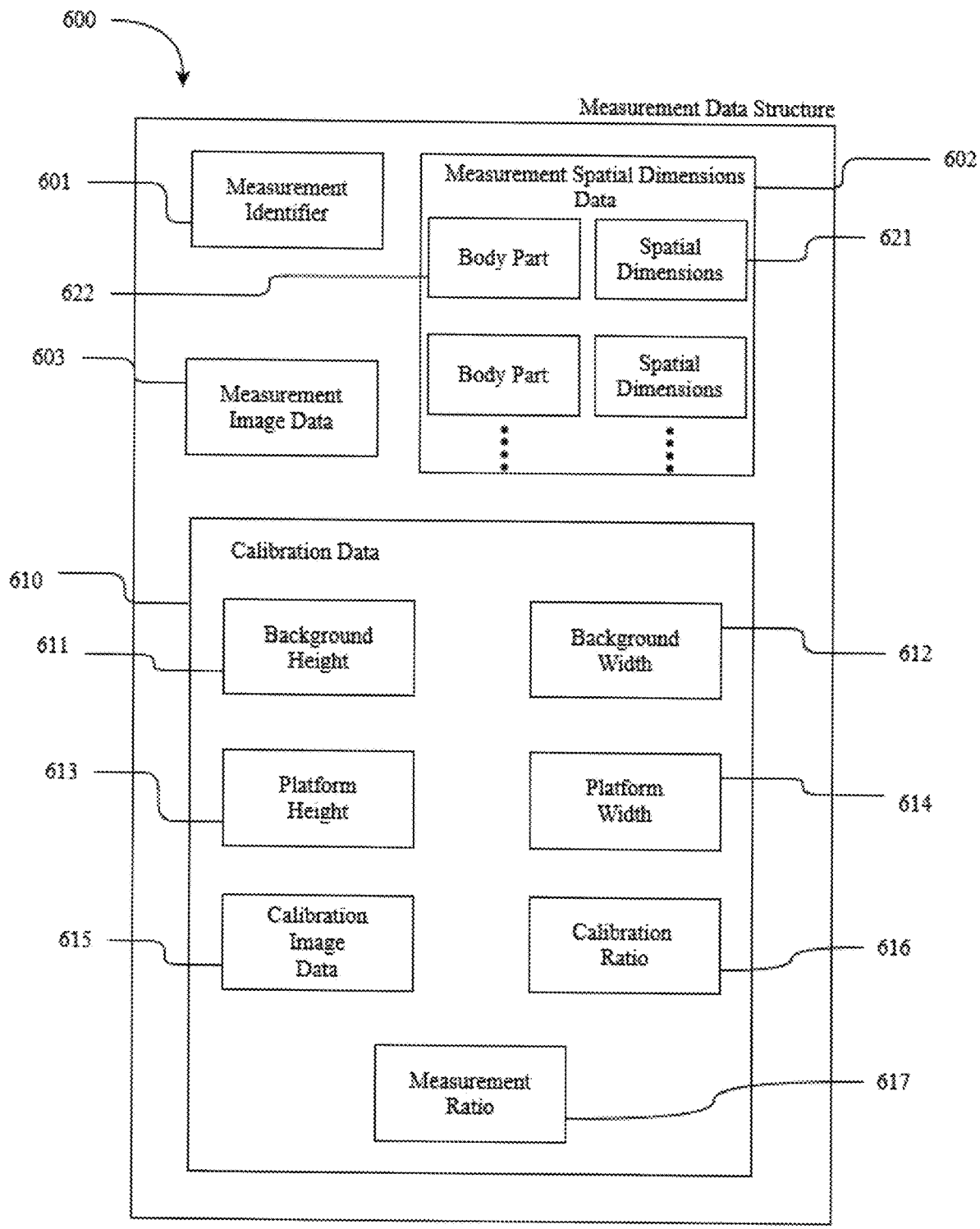
FIG. 6 depicts a sample measurement data structure according to an embodiment of the system to select wearable items.

FIG. 6 depicts a sample measurement data structure 600 according to an embodiment of the system to select wearable items. The measurement data structure 600 includes a measurement identifier 601, measurement spatial dimensions data 602, measurement image data 603, and calibration data 610. The measurement spatial dimensions data further includes one or more of spatial dimensions data 621 and one or more of body part data 622. The calibration data 610 further includes background height 611, background width 612, platform length 613, platform width 614, calibration image data 615, a calibration ratio 616, and a measurement ratio 617.

The measurement identifier 601 includes data identifying the subject being measured. The measurement spatial dimensions data 602 includes data describing the spatial dimensions of the subject identified by the measurement identifier 601. In the measurement spatial dimensions data 602, body part data 622 represents a portion of the subject. The body part data 622 is paired with spatial dimensions data 621, and the spatial dimensions data 621 includes data describing the spatial dimensions of the portion of the subject identified by the body part data 622. In some embodiments, the measurement spatial dimensions data 602 includes one or more pairs of body part data 622 and spatial dimensions data 621. In some embodiments, the spatial dimensions data 621 includes length, width, height, and diameter, etc. In some embodiments, the measurement spatial dimensions data includes one or more pairs of body part data 621 and spatial dimensions data 622. The measurement image data 603 includes image data representing the subject placed in front of the background 203.

The background height 611 includes data describing the height of the background 203. The background width 612 includes data describing the width of the background 203. The platform length 613 includes data describing the length of the platform 201. The platform width 614 includes data describing the platform 201. The calibration image data 615 includes image data representing the background 203 and the platform 201 that does not include the subject. The calibration ratio 616 includes data describing a ratio used by the system to identify wearable items to more accurately measure the subject. The measurement ratio 617 includes data describing a ratio used by the system to identify wearable items to convert measurements in pixels to measurements in other units, such as inches, feet, centimeters, millimeters, meters, or other units used to describe spatial dimensions. In some embodiments, the measurement ratio 617 is determined by utilizing the background width 612, background height 611, the calibration ratio 616, and the dimensions of the background in pixels. In some embodiments, the measurement ratio 617 is determined by utilizing the platform width 614, platform height 613, the calibration ratio 616, and the dimensions of the background in pixels.

In some embodiments, the measurement data structure 600 can include data describing the subject's name, shape, body type, or other attributes not related to the subject's spatial dimensions. In some embodiments, the measurement spatial dimensions data further includes ellipses corresponding to each body part data 622. In some embodiments, one or more of the background height 611, background width 612, platform height 613, and platform width 614 are predetermined.

Figure 7:
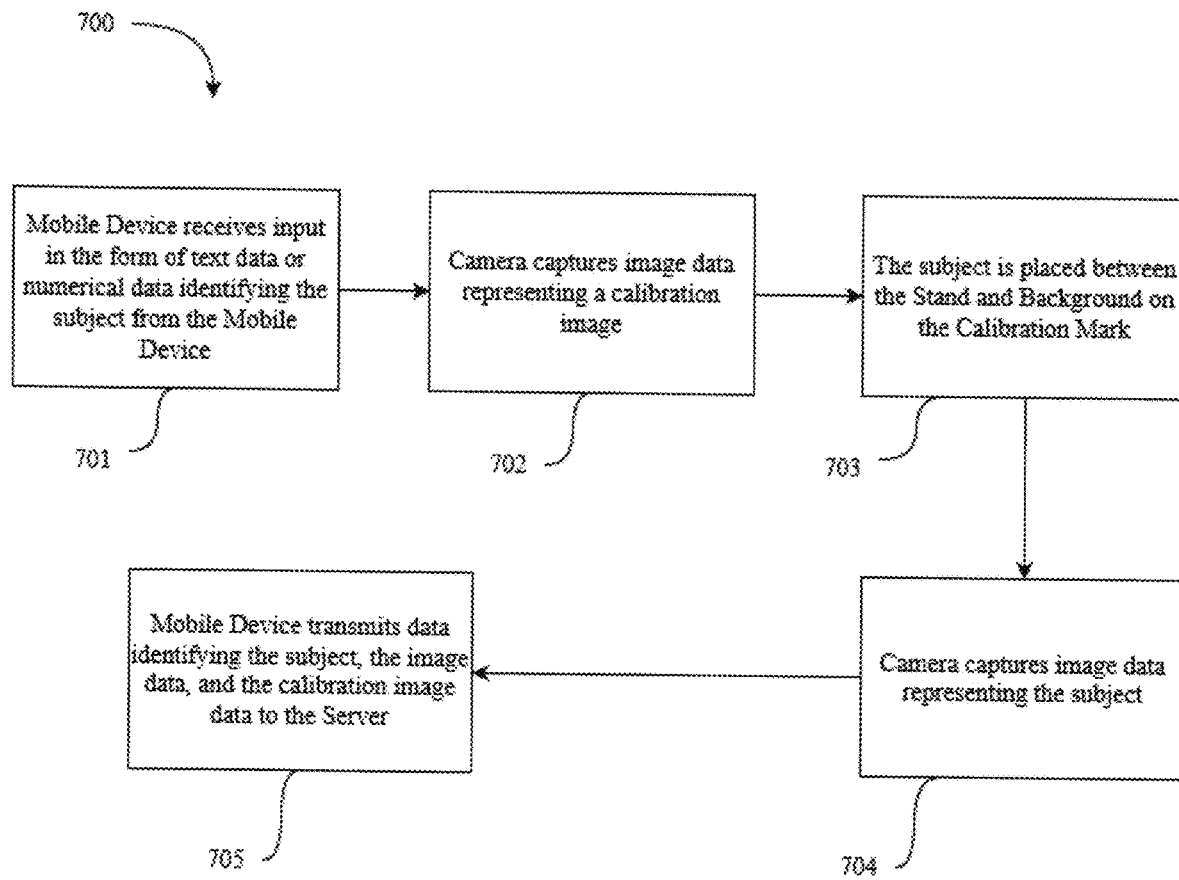
FIG. 7 is a flow diagram of the process to obtain image data of a subject according to an embodiment of the system to select wearable items.

FIG. 7 is a flow diagram of the process to obtain image data of a subject 700 according to an embodiment of the system to select wearable items. At act 701, the mobile device 300 receives user input describing the subject, such as the subject's name, identification number, body type, etc. At act 702, the camera 301 captures image data representing a calibration image of the background 203 before the subject is placed on the calibration mark 204. At act 703, the subject is placed on the Calibration Mark 204 in between the stand 202 and the background 203, at a predetermined distance from the stand 202. At act 704 the camera 301 captures image data representing the subject. At act 705, the mobile device 300 transmits the data identifying the subject, the image data, and the calibration image data to the server 400.

In some embodiments, the camera 301 captures multiple images of the subject, and transmits the multiple images of the subject to the server 400. In some embodiments, for each image captured by the camera 301, the subject is in a different position. In some embodiments, the camera 301 may capture images of the subject in a variety of poses, such as those illustrated in FIGS. 12-15.

In some embodiments, the screen 304 may display images illustrating how the subject should be positioned. In some embodiments, the predetermined distance from the stand 202 can be entered at the mobile device and transmitted to the server 400. In some embodiments, one or more of the background height 611, background width 612, platform height 613, or platform width 614 can be entered through user input at the mobile device 300 and is transmitted by the mobile device 300 to the server 400.

In some embodiments, the mobile device 300 performs post-processing on the captured image data to remove biometric identifiers of the subject, such as by blurring the subject's face and other identifying features, before transmitting the image data. In some embodiments, the mobile device 300 performs post-processing on the image data such as modifying the subject in the image data to be a silhouette of the subject before transmitting the image data.

Figure 8:
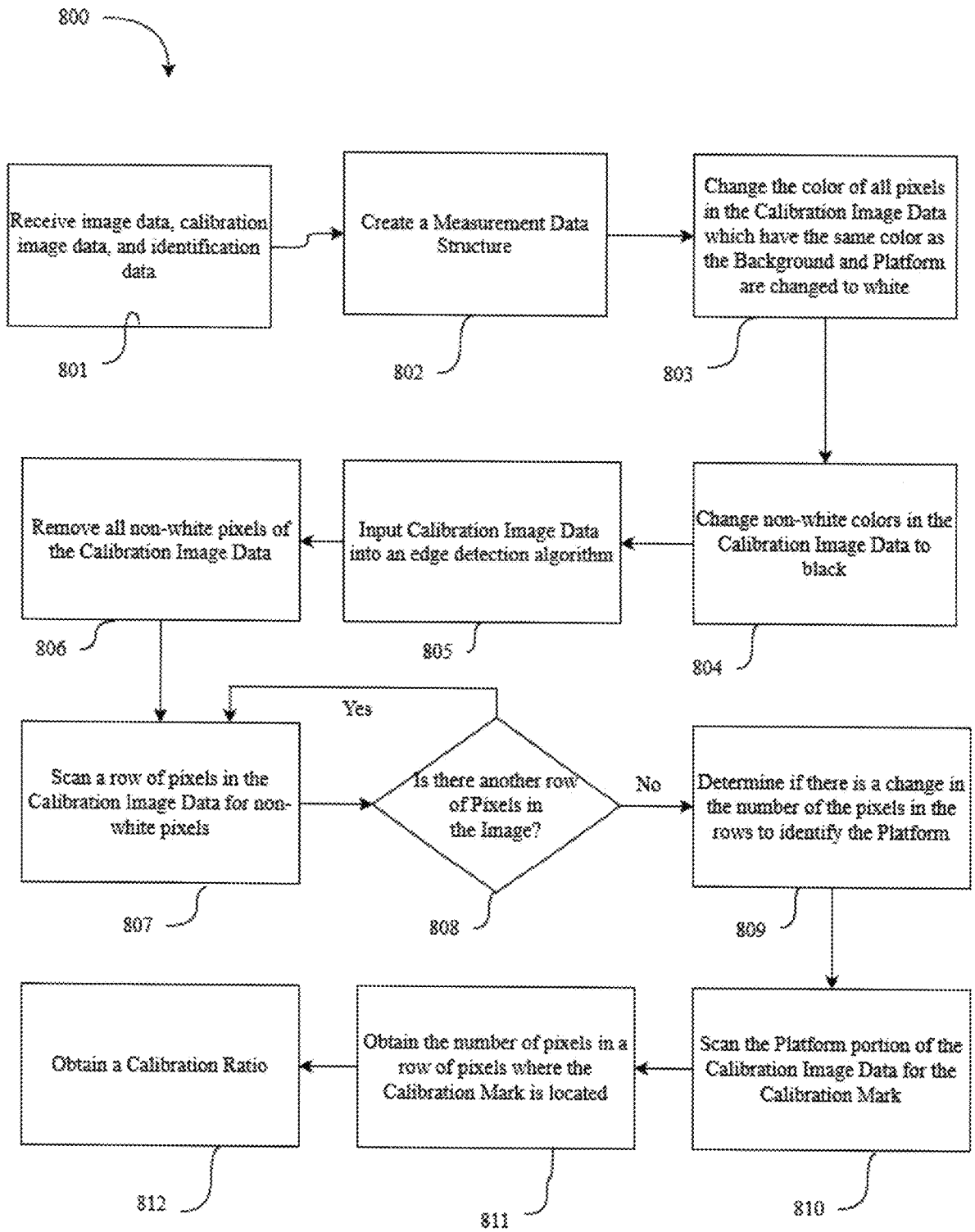
FIG. 8 depicts a flow diagram of the process to calibrate measurement parameters according to an embodiment of the system to select wearable items.

FIG. 8 depicts a flow diagram of the process to calibrate measurement parameters 800 according to an embodiment of the system to select wearable items. At act 801, the server 400 receives image data, calibration image data, and identification data from the mobile device 300. At act 802, the server 400 creates a measurement data structure 600 and stores the received identification data as a measurement identifier 601, stores the received image data as measurement image data 603, and stores the received calibration image data as calibration image data 615 in the newly created measurement data structure 600.

At act 803, the predetermined colors of the background 203 and the platform 201 in the calibration image data 615 are changed to the color white. At act 804, all non-white colors in the calibration image data 615 are changed to the color black. At act 805, the calibration image data 615 is input into an edge detection algorithm, such as a Canny Edge Detection Algorithm. At act 806, all non-white pixels of the image are removed from the calibration image data 615. At act 807, a row of pixels in the calibration image data 615 is scanned for non-white pixels from left to right to determine the number of non-white pixels in the row. At act 808, if there is another row of pixels in the calibration image data 615, act 807 is repeated for that row of pixels. After each of the rows of pixels present in the calibration image data 615 have been scanned, the process continues to act 809.

At act 809, the total number of non-white pixels in each row is checked to determine if there is a higher rate of change in the number of non-white pixels in each row over a predetermined number of consecutive rows to identify the platform 201. For example, the background 203 may have little or no change in the number of non-white pixels for each row of pixels representing the background 203, but the platform 201 may have more or less non-white pixels in each row of pixels representing the platform 201. Thus, determining where the number of non-white pixels in each row of pixels begins to increase or decrease and determining that the rate at which the number of non-white pixels increase or decrease for each row allows the system to select wearable items to identify where the background 203 ends and the platform 201 begins.

At act 810, platform 201 identified in act 809 is scanned to find the calibration mark 204. In some embodiment, the calibration mark 204 is identified by searching for white pixels located in the portion of the image occupied by the platform 801. At act 811, the number of pixels in the row that the calibration mark 204 is located is obtained. At act 812, the calibration ratio 616 is obtained by dividing the number of non-white pixels obtained in act 811 by the number of non-white pixels in the top row of the image. At act 813, the measurement ratio 617 is obtained by applying the calibration ratio 616 to the dimensions of the background in pixels and comparing the calibrated dimensions to the background height 611 and the background width 612. In some embodiments, the measurement ratio 617 is obtained by applying the calibration ratio 616 to the dimensions of the platform in pixels and comparing the calibrated dimensions to the platform height 613 and platform width 614.

In some embodiments, edge detection algorithms other than the Canny Edge Detection algorithm are used. In some embodiments, colors other than white and black can be used when scanning the image.

In the preferred embodiment, the predetermined number of consecutive rows used in act 809 is 20. In some embodiments, the predetermined number of consecutive rows used in act 809 is greater than 20. In some embodiments, the predetermined number of consecutive rows use used in act 809 is less than 20.

In some embodiments, a row of pixels other than the top row of pixels may be scanned first. In some embodiments, the rows of pixels are scanned in an order other than top-down. In some embodiments, the rows of pixels are scanned in an order other than from left-to-right.

Figure 9:
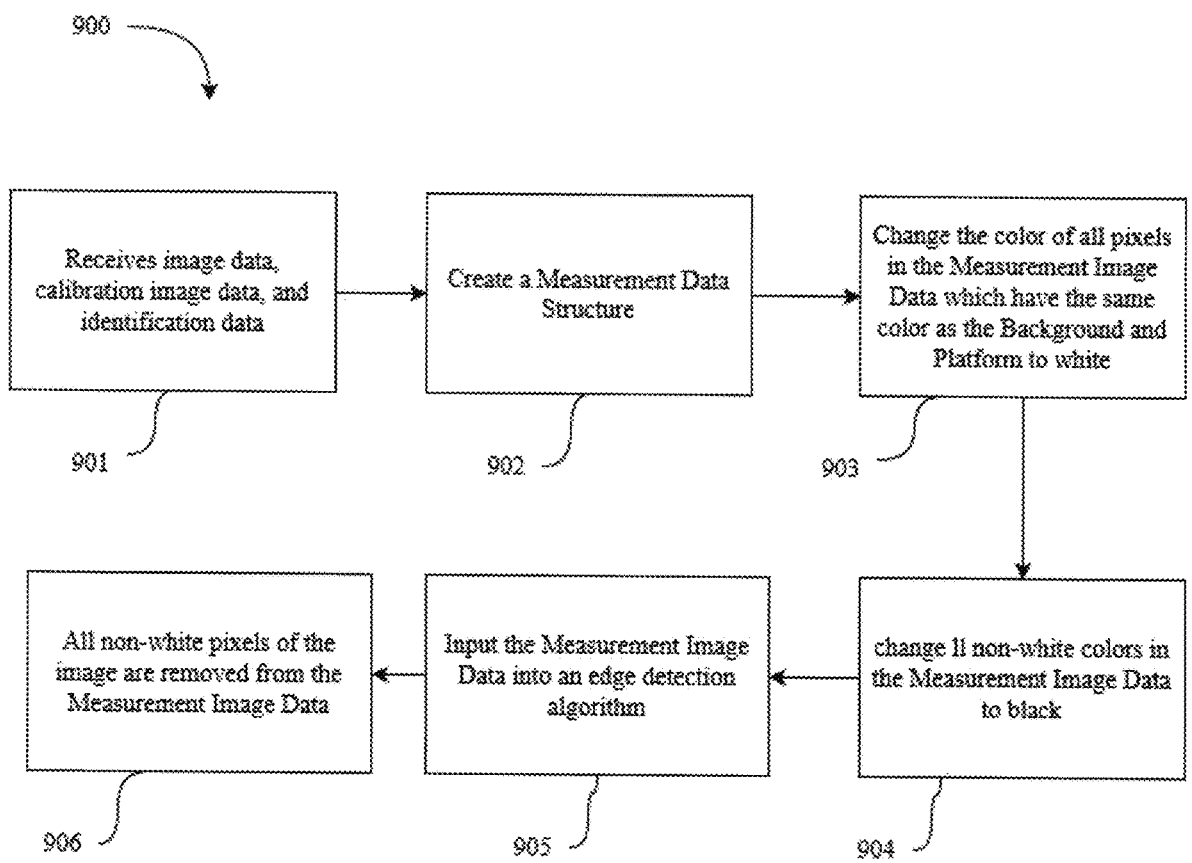
FIG. 9 is flow diagram depicting a process to create a wireframe according to an embodiment of the system to select wearable items.

FIG. 9 is flow diagram depicting a process to create a wireframe 900 according to an embodiment of the system to select wearable items. At act 901, the server 400 receives image data, calibration image data, and identification data from the mobile device 300. At act 902, the server 400 creates a measurement data structure 600 and stores the identification data as the measurement identifier 601, the calibration image data as calibration image data 615, and the image data as measurement image data 603. At act 903, the color of all the pixels in the measurement image data 603 that have the same color as the background 203 and platform 201 are changed to the color white.

At act 904, all non-white colors in the measurement image data 603 are changed to the color black, such that a silhouette of the subject is created over the background 203 and platform 201. At act 905, the measurement image data 603 is input into an edge detection algorithm as described in act 805 of FIG. 8. At act 906, all non-white pixels of the image are removed, such as by changing the color of the pixel to a null value (a "null pixel"), from the measurement image data 603.

In some embodiments, edge detection algorithms other than the Canny Edge Detection algorithm can be used. In some embodiments, colors other than white and black can be used in acts 903 and 904 respectively.

Figure 10:
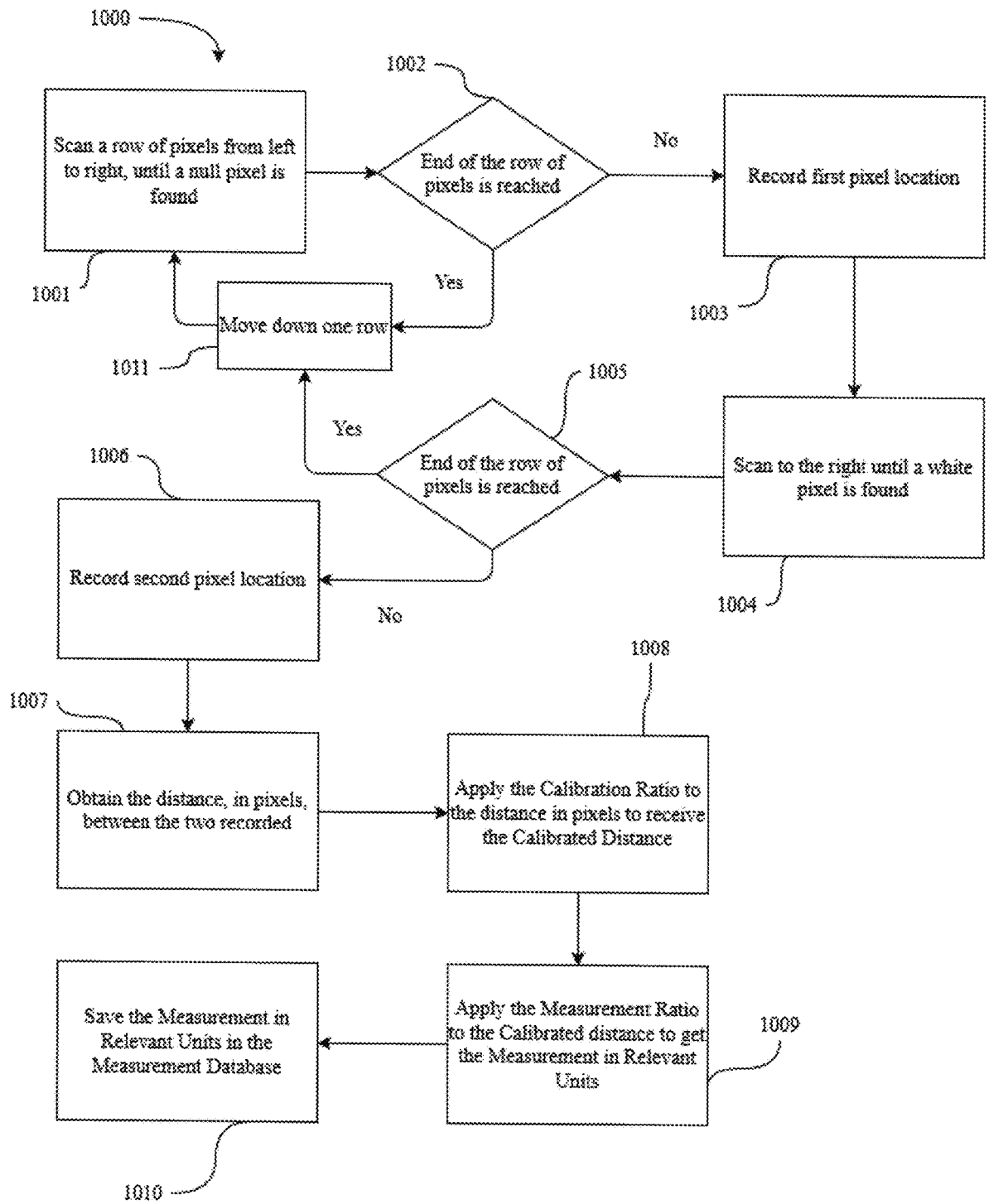
FIG. 10 is a flow diagram depicting a process to measure a wireframe according to an embodiment of the system to select wearable items.

FIG. 10 is a flow diagram depicting a process to measure a wireframe 1000 according to an embodiment of the system to select wearable items. In some embodiments the process depicted in FIG. 9 is completed before beginning the process to measure a wireframe, and the process to measure a wireframe 1000 is performed on the output of the process depicted in FIG. 9. At act 1001, the top row of pixels of the measurement image data 603 is scanned from left to right, until a null pixel is found. At act 1002, if the end of the row has been reached without finding a null pixel, the process moves to act 1011. At act 1011, the next row is selected, and act 1001 is performed with the next row of pixels. If a null pixel has been found before reaching the end of the row the process continues to act 1003. At act 1003, the location of the null pixel is recorded.

At act 1004, the row is scanned from the location of the first recorded pixel until white pixel is found. At act 1005, if the end of the row of pixels is reached before finding a white pixel, the process moves to act 1011. If a white pixel is found before reaching the end of the row, the location of the white pixel is recorded at act 1006.

At act 1007, the distance in pixels between the recorded null pixel and the recorded white pixel is determined. At act 1008, the calibration ratio obtained in the process depicted by FIG. 8 is applied to the distance in pixels obtained in act 1007 to obtain a calibrated distance in pixels. At act 1009, the measurement ratio 617, previously determined in the process depicted in FIG. 8 is applied to the calibrated distance in pixels to obtain the measurement in relevant units such as centimeters, inches, or other units used to describe spatial dimensions. At act 1010, the measurement in relevant units is stored as measurement spatial dimensions data 602. In some embodiments, if a body part has been identified for the measurement, the measurement in relevant units is stored as spatial dimensions data 621 is logically related to the body part data 622 indicating the identified body part. In some embodiments, at act 1001, the first row of pixels scanned is a row of pixels corresponding to an identified body part.

Figure 11:
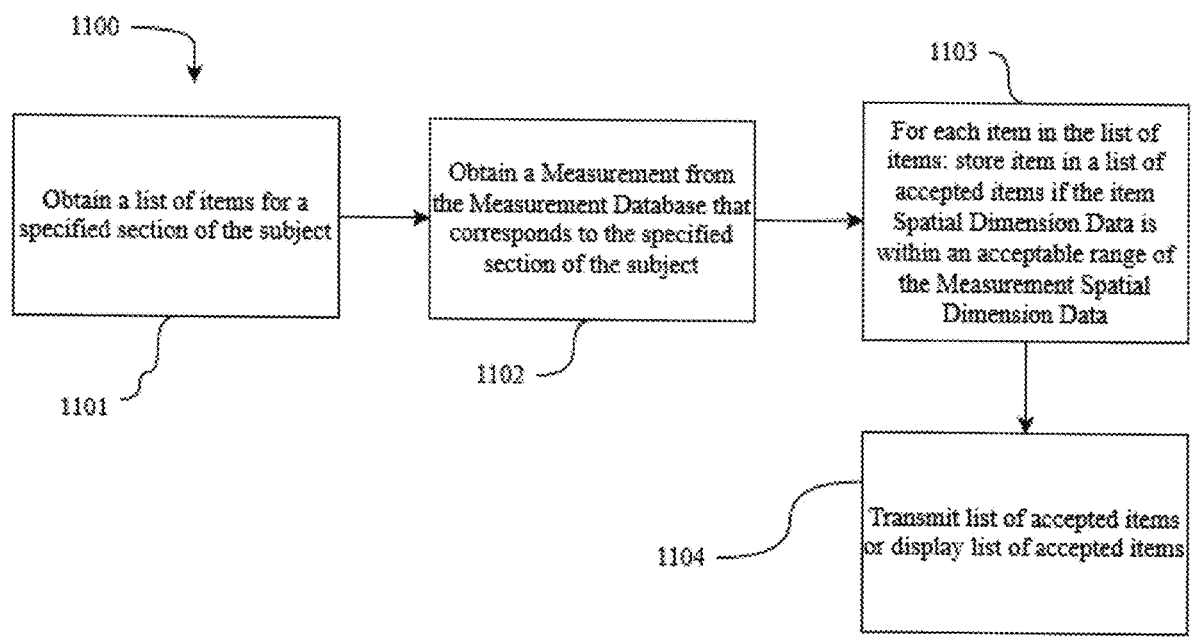
FIG. 11 is a flow diagram depicting a process to select items according to an embodiment of the system to select wearable items.

FIG. 11 is a flow diagram depicting a process to select items 1100 according to an embodiment of the system to select wearable items. At act 1101, the system to select wearable items receives user input specifying a section, or body part, such as a hand, foot, am, torso, head, etc., of the subject and then the system to select wearable items retrieves a list of item data structures 500 with an item type 501 indicating the section, or body part from the item database 404. In some embodiments, when performing act 1101, the system to select wearable items receives user input specifying a type of wearable item such as boots, gloves, shirts, pants, hats, shoes, jackets, etc. instead of receiving user input specifying a section, or body part. At act 1102, the system to select wearable items retrieves the spatial dimensions data 621 corresponding to the section, or body part 622, identified in act 1101 from the measurement data structure 600.

At act 1103, for each item in the list of item data structures 500 retrieved in act 1101, the spatial dimensions stored within the item spatial dimensions data 502 are compared to the spatial dimensions data 621. If the spatial dimensions data 621 includes spatial dimensions within the acceptable range indicated by the acceptable range data 503 then the item indicated by the item data structure 500 is added to a list of accepted items. At act 1104, the list of accepted items is transmitted or displayed. In some embodiments, when performing act 1101, the system to select wearable items uses a predetermined list of items and/or body parts, and then the system to select wearable items performs the process to select items for every item or body part included in the predetermined list of items and/or body parts.

In some embodiments, a "thickness factor" is also applied to compute the effect of multilayered clothing. In some embodiments, the thickness factor includes data describing how a wearable item fits when worn with, over, under, etc., other items. In such embodiments, the thickness factor is included in the acceptable range data 503, and the thickness factor is utilized in determining whether the item should be included in the list of accepted items. In some embodiments, user input is obtained to establish a maximum thickness of certain wearable items, such as, for example, establishing that the wearable items cannot be thicker than half (½) an inch. In some embodiments, the maximum thickness is predetermined. In embodiments that utilize the thickness factor, the item will be added to the list if it is within a certain "thickness" for wearable items that are worn as layers, such as overcoats, jackets, snow-pants, and other layered clothes. In some embodiments, the thickness factor is an indicator of how thick a wearable item is. For example, a jacket may have a thickness of one inch, and a sweater may have a thickness of a quarter (¼) of an inch. If the subject desires only clothes or outfits with a thickness factor of one inch or less, the system to select wearable items may suggest the subject obtain one of the one-inch jacket or the ¼-inch sweater, but will not suggest both to be worn at the same time. The thickness factor ensures that clothes are not too thick as to be too tight on a subject, or not thick enough as to be too loose on a subject. This factor operates in a similar way to the acceptable range, and items that are not within the requirements of the thickness factor are not added to the list.

Figure 12:
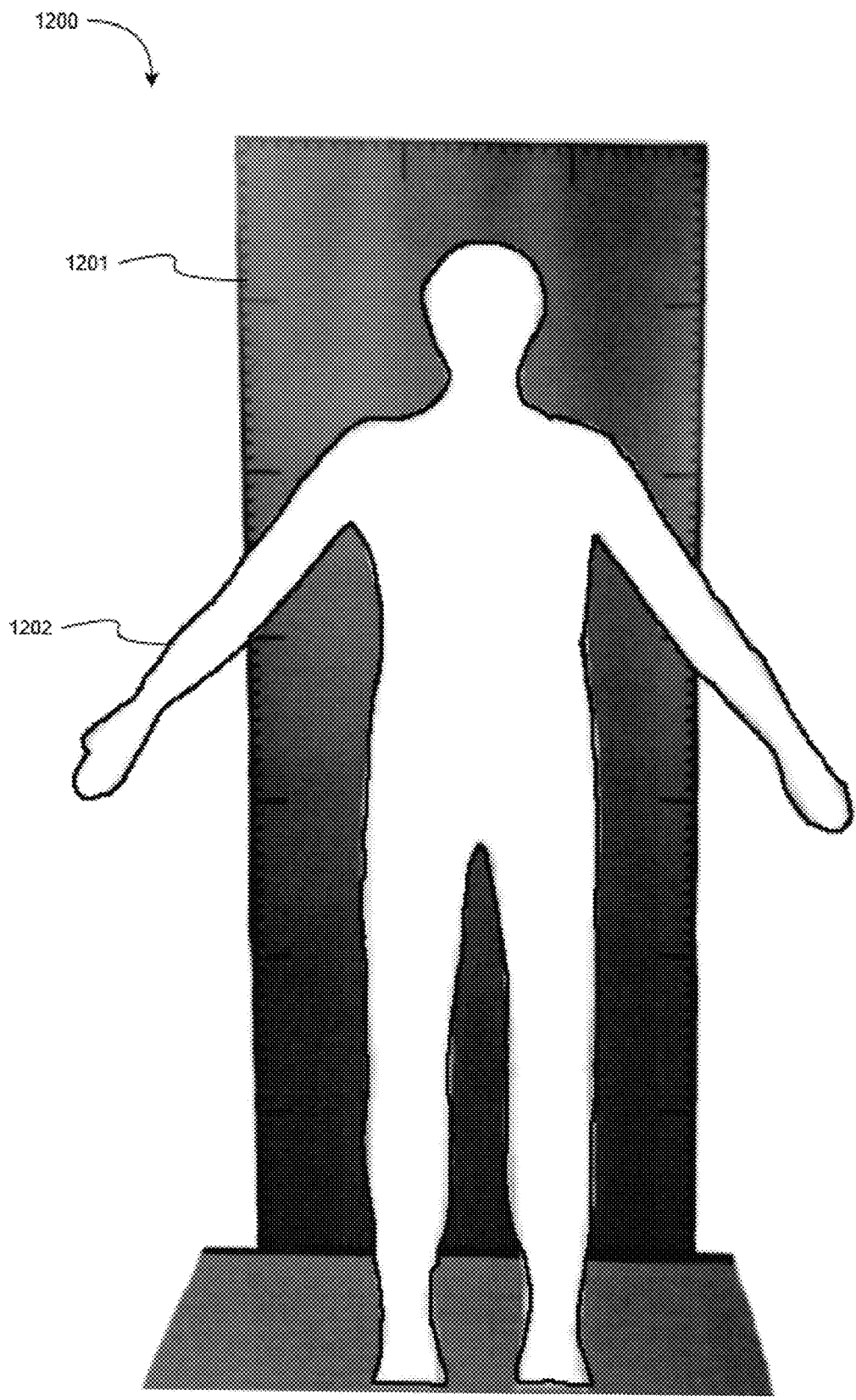
FIG. 12 depicts a forward pose, displayed by the system to select wearable items in some embodiments.

FIG. 12 depicts a forward pose 1200, displayed by the system to select wearable items in some embodiments. Depicted in the forward pose is the background 1201 and the pose 1202. In some embodiments, the system to select wearable items displays the forward pose 1200 to the subject. In some embodiments, the pose 1202 is useful for measuring the subject's head width, torso width, chest width, shoulder width, leg length, neck width, foot width, height, inseam, ankle width, etc.

Figure 13:
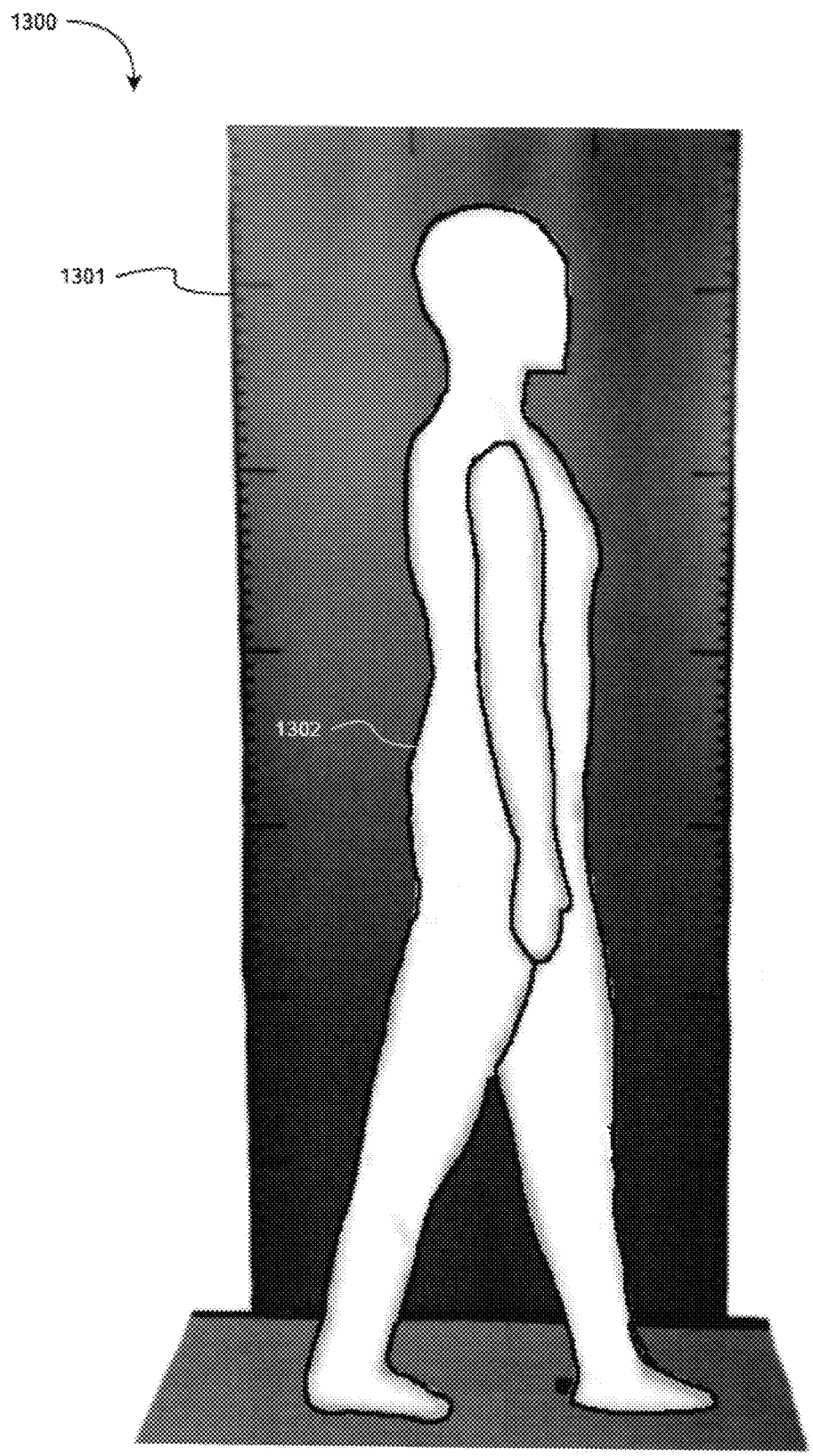
FIG. 13 depicts a side pose, displayed by the system to select wearable items in some embodiments.

FIG. 13 depicts a side pose 1300, displayed by the system to select wearable items in some embodiments. Depicted in the side pose 1300 is the background 1301 and the pose 1302. In some embodiments, the system to select wearable items displays the side pose 1300 to the subject. In some embodiments, the pose 1302 is useful for measuring the subject's head length, torso length, chest length, shoulder length, leg width, neck length, foot length, height, etc.

Figure 14:
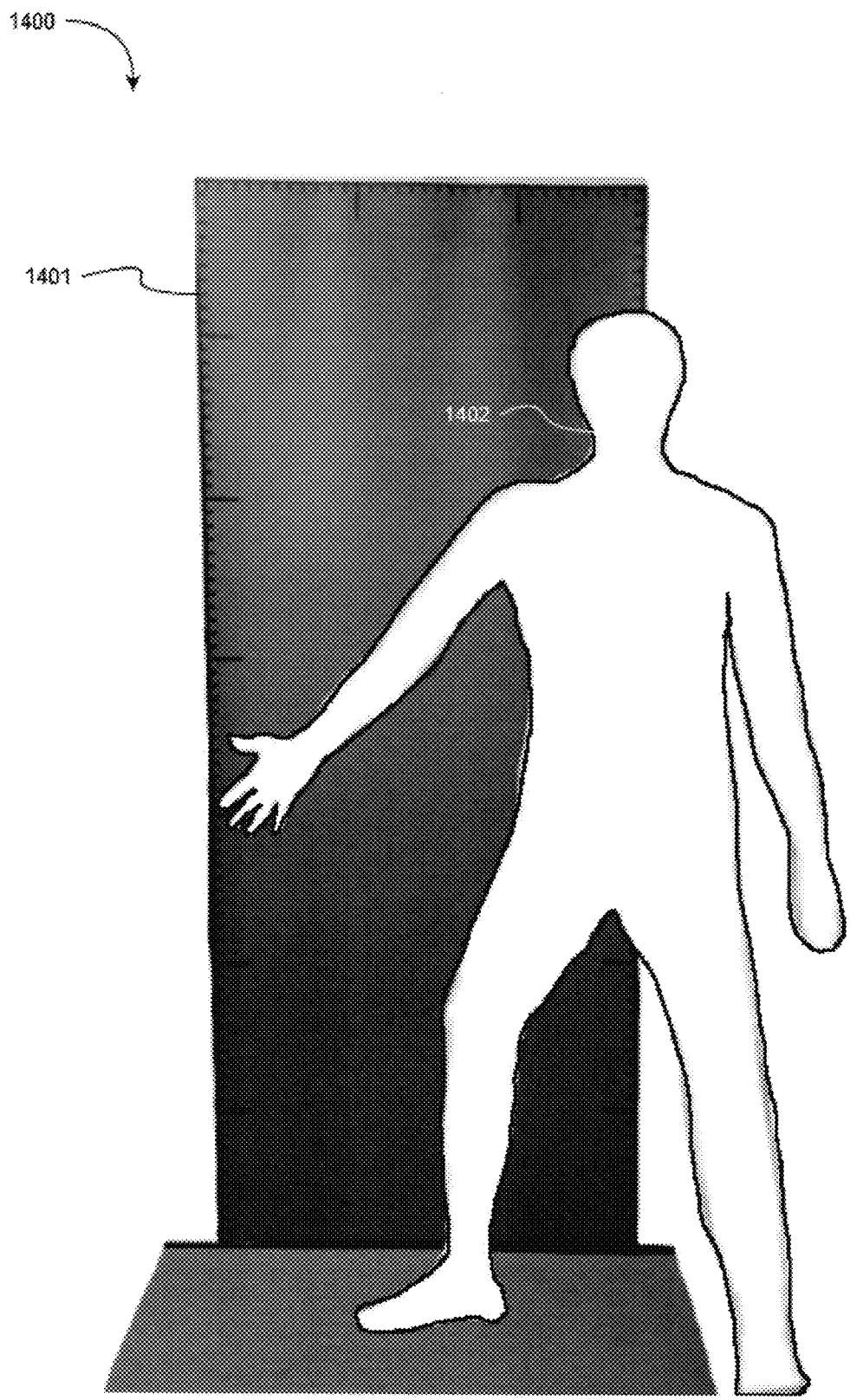
FIG. 14 depicts a first half pose, displayed by the system to select wearable items in some embodiment.

FIG. 14 depicts a first half pose 1400, displayed by the system to select wearable items in some embodiments. Depicted in the first half pose 1400 is the background 1401 and the pose 1402. In some embodiments, the system to select wearable items displays the first half pose 1400 to the subject. In some embodiments, the pose 1402 is useful for measuring the subject's hand length, lower leg length, upper leg length, arm length, arm width, cuff size, foot length, foot arch, finger length, etc.

Figure 15:
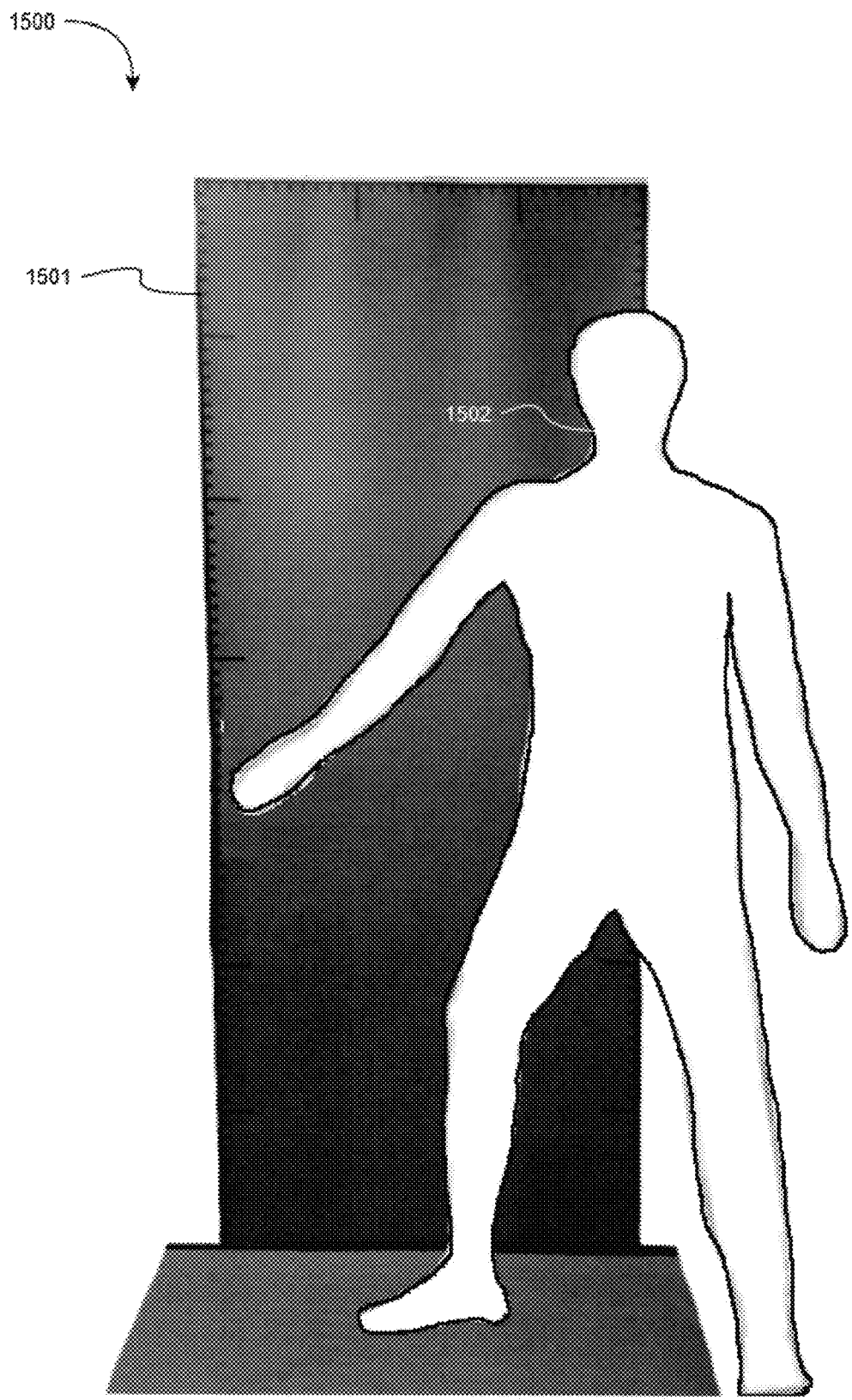
FIG. 15 depicts a second half pose, displayed by the system to select wearable items in some embodiments.

FIG. 15 depicts a second half pose 1500, displayed by the system to select wearable items in some embodiments. Depicted in the second half pose 1500 is the background 1501 and the pose 1502. In some embodiments, the system to select wearable items displays the second half pose 1500 to the subject. In some embodiments, the pose 1502 is useful for measuring the subject's hand length, hand width, lower leg length, upper leg length, arm length, arm width, cuff size, foot length, foot arch, etc.

Figure 16:
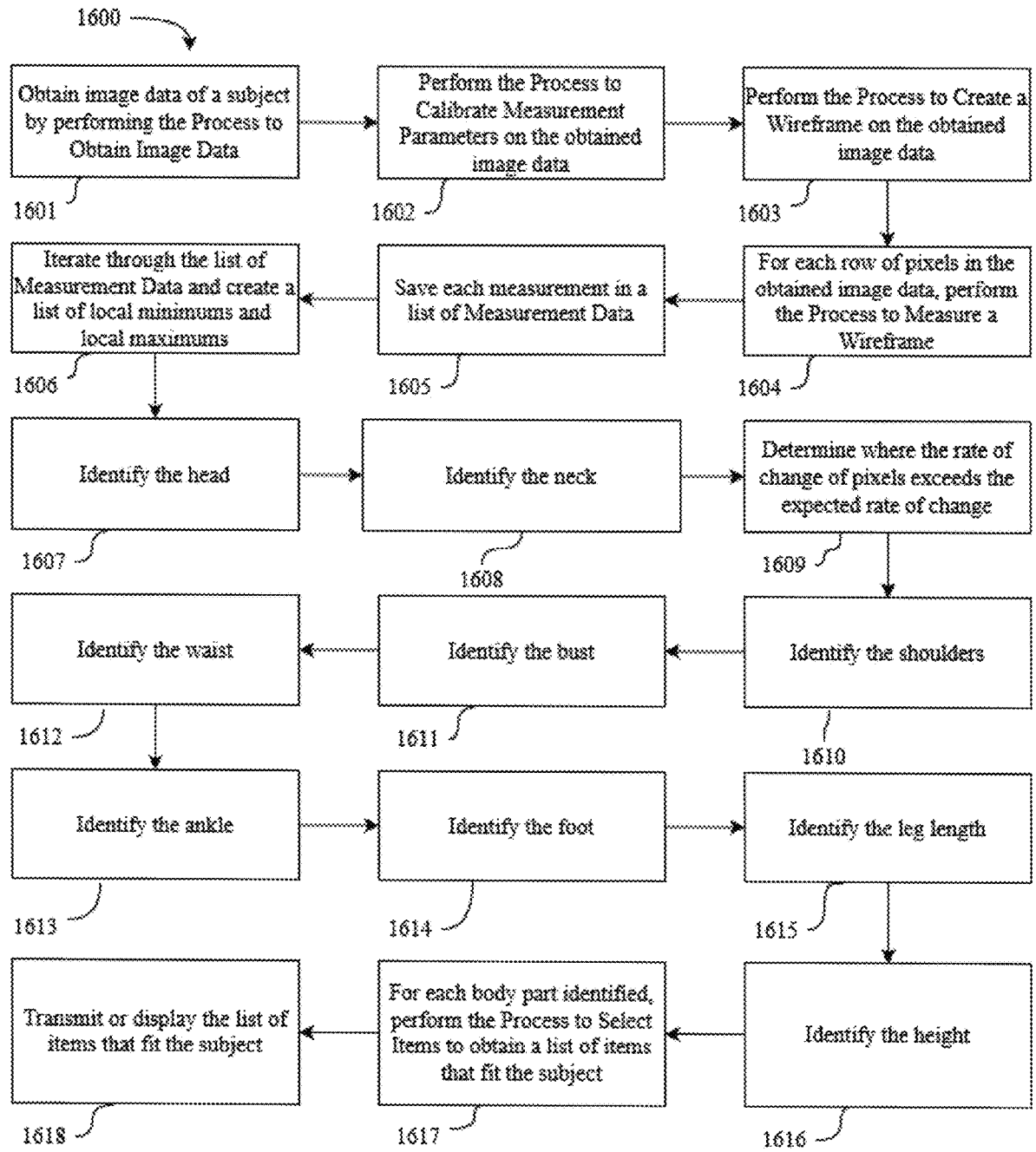
FIG. 16 is a flow diagram depicting a process to measure a subject according to an embodiment of the system to select wearable items.

FIG. 16 is a flow diagram depicting a process to measure a subject 1600 according to an embodiment of the system to select wearable items. At act 1601, the server 400 obtains image data of a subject by performing the process to obtain image data described in FIG. 7. At act 1602, the server 400 performs the process to calibrate measurement parameters depicted in FIG. 8. At act 1603, the server performs the process to create a wireframe depicted in FIG. 9.

At act 1604, for each row of pixels in the obtained image data, the server 400 performs the process to measure a wireframe depicted in FIG. 10. At act 1605, the server 400 uses the data obtained in act 1604 to populate a list of the number of null pixels in each row (a "measurement list"). At act 1606, the server 400 iterates through the measurement list to identify the local minimums, identify the local maximums, and create a list containing the local minimums and local maximums. The local minimums and local maximums correspond to minimums and maximums in the number of null pixels counted. For example, if the list containing the number of null pixels in each row includes {1, 3, 5, 6, 4, 3, 2, 5 . . . }, 1 is identified as the first local minimum, 6 as the first local maximum, 2 as the next local minimum, etc.

At act 1607, the server 400 identifies the row containing the first local maximum and marks that row as the head, converts the number of null pixels in the row to a spatial dimension by using the calibration ratio and measurement ratio, and stores the calculated spatial dimension as a head in the measurement spatial dimension data 602. At act 1608, the server 400 identifies the first local minimum after the first local maximum, converts the number of null pixels in the row to a spatial dimension by using the calibration ratio and measurement ratio, and stores the calculated spatial dimension as a neck in the measurement spatial dimension data 602.

At act 1609, the server 400 continues from the row of pixels identified as the neck, and identifies where the rate of change of total pixels in the subsequent rows of pixels increases at a higher rate than the expected rate of change for the neck. In some embodiments, the expected rate of change is determined by the body type of the subject. At act 1610 the server 400 converts the number of null pixels in the row where the rate of change is determined to be higher than the expected rate of change to a spatial dimension by using the calibration ratio and measurement ratio, and stores the calculated spatial dimension as shoulders in the measurement spatial dimension data 602. In some embodiments, in acts 1609 and 1610, the expected rate of change is determined based on the section of the image being measured and that section's relationship to a subject's body part. In some embodiments, the system to select wearable items determines which expected rate of change to use in acts 1609 and 1610 based on the subject's body type. In some embodiments, the system to select wearable items determines the expected rate of change used in acts 1609 and 1610 by choosing an expected rate of change similar to the expected rate of change used for other subjects with a body type similar to the subject.

At act 1611, the server 400 identifies the row containing the next local minimum, converts the number of null pixels in the row to a spatial dimension by using the calibration ratio and measurement ratio, and stores the calculated spatial dimension as the bust in the measurement spatial dimension data 602. At act 1612, the server 400 identifies the row containing the next local maximum, converts the number of null pixels in the row to a spatial dimension by using the calibration ratio and measurement ratio, and stores the calculated spatial dimension as a waist in the measurement spatial dimension data 602.

At act 1613, the server 400 identifies the row containing the next local minimum, converts the number of null pixels in the row to a spatial dimension by using the calibration ratio and measurement ratio, and stores the calculated spatial dimension as an ankle in the measurement spatial dimension data 602. At act 1614, the server 400 identifies the next local maximum, converts the number of null pixels in the row to a spatial dimension by using the calibration ratio and measurement ratio, and stores the calculated spatial dimension as a foot in the measurement spatial dimension data 602.

At act 1615, the server 400 determines the vertical distance in pixels between the row identified as the waist and the row identified as the ankle; converts the vertical distance in pixels to a spatial dimension by using the calibration ratio and measurement ratio; and stores the calculated spatial dimension as the leg length in the measurement spatial dimension data 602. At act 1616, the server 400 identifies the vertical distance in pixels between the first local minimum and the last local minimum; vertical distance in pixels between the row identified as the waist and the row identified as the ankle; converts the vertical distance in pixels to a spatial dimension by using the calibration ratio and measurement ratio; and stores the calculated spatial dimension as the height in the measurement spatial dimension data 602.

At act 1617, for each body part identified by the server 400, the server performs the process depicted in FIG. 11 to obtain a list of items that fit the subject. At act 1618, the server 400 displays the list obtained in act 1617. In some embodiments, the server 400 transmits the list obtained in act 1617 to another device.

In some embodiments, other local minimums and local maximums are used to identify different body parts. In some embodiments, the process depicted in FIG. 16, or a similar process that measures other body parts, such as arm length, cuff size, arch length, etc., is performed on multiple images of a subject. In some embodiments, the multiple images of the subject depict the subject in a variety of poses, such as those depicted in FIGS. 12-15. In some embodiments, the server 400 obtains spatial dimensions data for each body part by measuring the same body part in different images depicting the subject and averaging the spatial dimensions obtained.

In some embodiments, where a row contains multiple occurrences of null value pixels separated by non-null value pixels, such as, for example, when the silhouette depicts an arm next to, but not in contact with, a torso as seen in FIG. 12, the server 400 uses multiple measurement lists. In such embodiments, the server 400 identifies which measurement list is more likely to contain certain body parts, such as an arm, a torso, a leg, etc., by analyzing the number of null pixels in each row of the measurement lists. In some embodiments, the server 400 identifies which measurement list is more likely to contain certain body parts by analyzing the location of each row stored in each measurement list. In some embodiments, the server 400 utilizes multiple measurement lists to identify different body parts.

Figure 17:
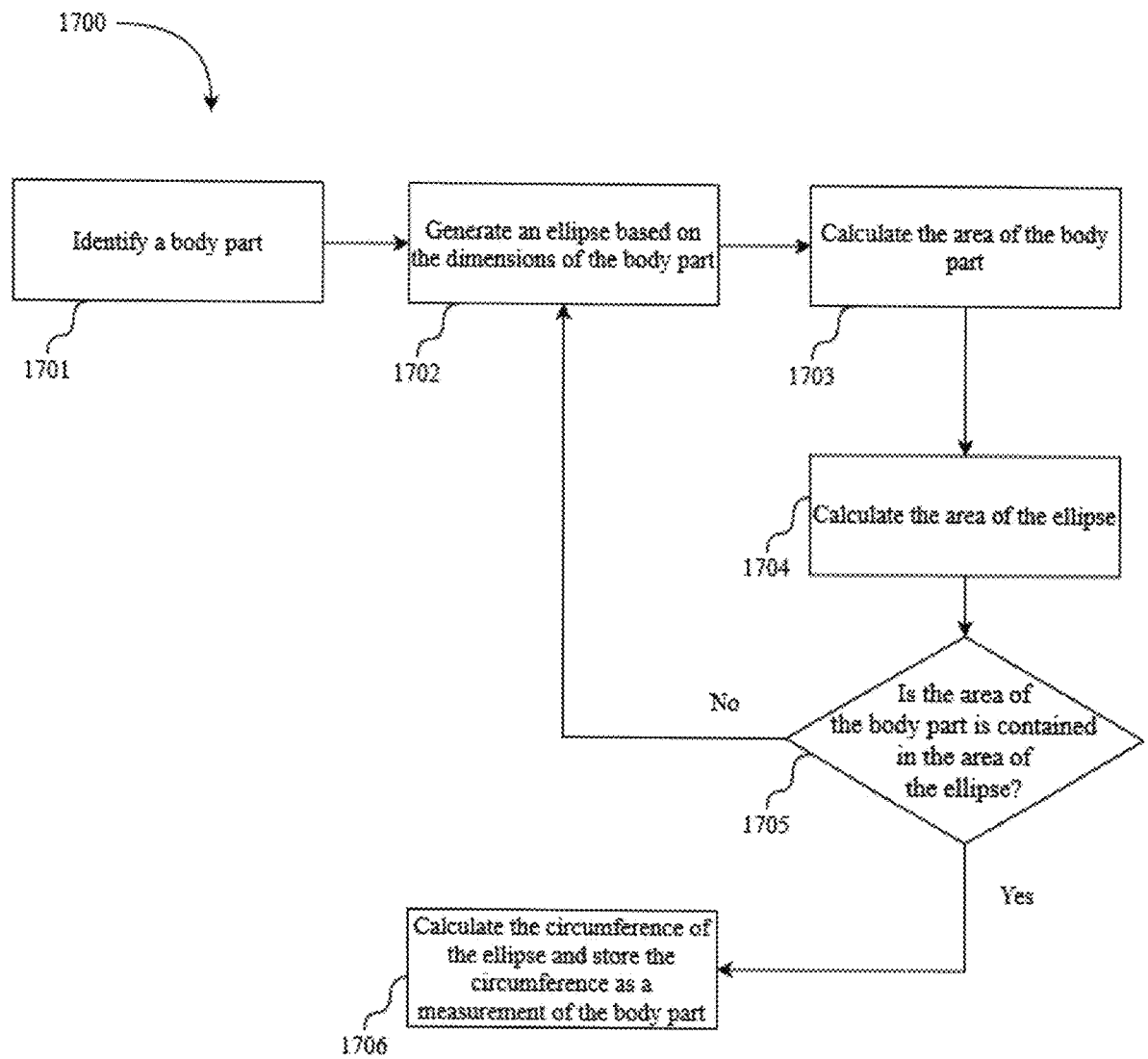
FIG. 17 is a flow diagram depicting a process to utilize ellipses to measure a subject used by the system to select wearable items in some embodiments.

FIG. 17 is a flow diagram depicting a process to utilize ellipses to measure a subject 1700 used by the system to select wearable items in some embodiments. In the preferred embodiment, the process to utilize ellipses to measure a subject 1700 is performed after the process to measure a subject 1600. In some embodiments, the process to utilize ellipses to measure a subject 1700 is used in conjunction with the process to measure a subject 1600.

At act 1701, the server 400 identifies a body part. At act 1702, the server 400 generates an ellipse based on the spatial dimensions of the body part retrieved from the measurement spatial dimensions data 602. At act 1703, the server 400 uses the spatial dimensions of the body part to calculate the area of the body part. At act 1704, the server 400 calculates the area of the generated ellipse.

At act 1705, the server 400 determines if the area of the body part is contained within the area of the ellipse. In some embodiments, the server performs this determination by comparing the area of the body part in pixels to the area of the ellipse in pixels. In some embodiments, the server performs this determination by determining if the area of the body part is within a predetermined range of percentages, such as, for example, 90%-110%, of the area of the ellipse. If the area of the body part is not contained within the area of the ellipse, the server 400 returns to step 1702 and generates a different type of ellipse based on the spatial dimensions data. If the area of the body part is contained within the area of the ellipse, the server 400 proceeds to act 1706. At act 1706, the server 400 calculates the circumference of the ellipse and stores the calculated circumference as a measurement of the body part.

In some embodiments, the server 400 generates one of three different ellipses, each corresponding to a body type, such as thin, medium, or large. In some embodiments, the body type corresponds to a range of Body Mass Index values. In some embodiments, if none of the ellipses are within the predetermined range of percentages, the server 400 chooses the ellipse which is nearest to the predetermined range of percentages. For example, if the predetermined range of percentages is 90%-110%, and the area of the the ellipses were 85%, 70%, and 111% of the area of the body part, the ellipse with 111% of the area of the body part will be chosen.

Figure 18:
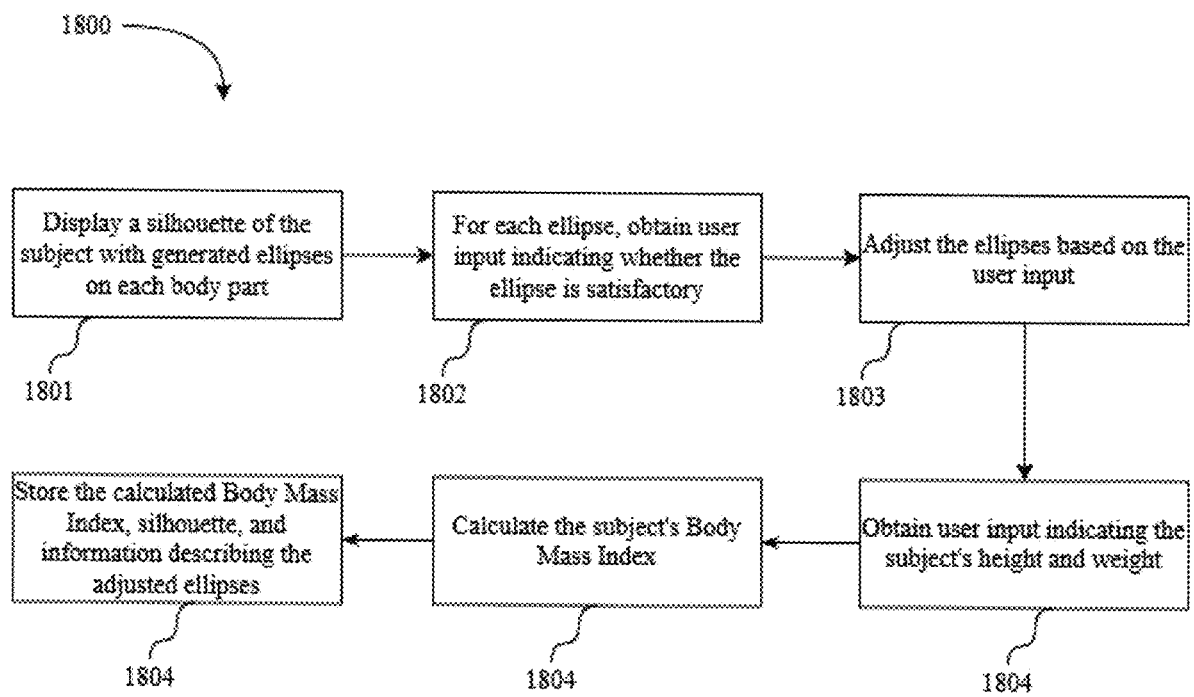
FIG. 18 is a flow diagram depicting a process to calibrate ellipses used by the system to select wearable items in some embodiments.

FIG. 18 is a flow diagram depicting a process to calibrate ellipses 1800 used by the system to select wearable items in some embodiments. At act 1801, an image depicting a silhouette of the subject with the ellipses generated in the process described in FIG. 17 placed on their corresponding body part is displayed to a user. At act 1802, the user indicates whether the ellipse is satisfactory. At act 1803, the ellipses are adjusted based on the users input. In some embodiments, the user manipulates and adjusts the ellipses. In some embodiments, when the user indicates the ellipse is unsatisfactory, the ellipses are automatically adjusted or converted to an ellipse of a different type.

At act 1804, the user indicates the subject's height and weight. At act 1805, the subject's Body Mass index is calculated based on the indicated height and weight. At act 1806, the calculated Body Mass Index, silhouette, and information describing the adjusted ellipses is stored.

In some embodiments, the process depicted by FIG. 18 is performed on the server 400. In some embodiments, the process depicted by FIG. 18 is performed on the mobile device 300. In some embodiments, the process depicted by FIG. 18 is performed on the computing device 110. In some embodiments, the process depicted by FIG. 18 is performed on one or more of the mobile device 300, the server 400, or the computing device 110.

Figure 19:
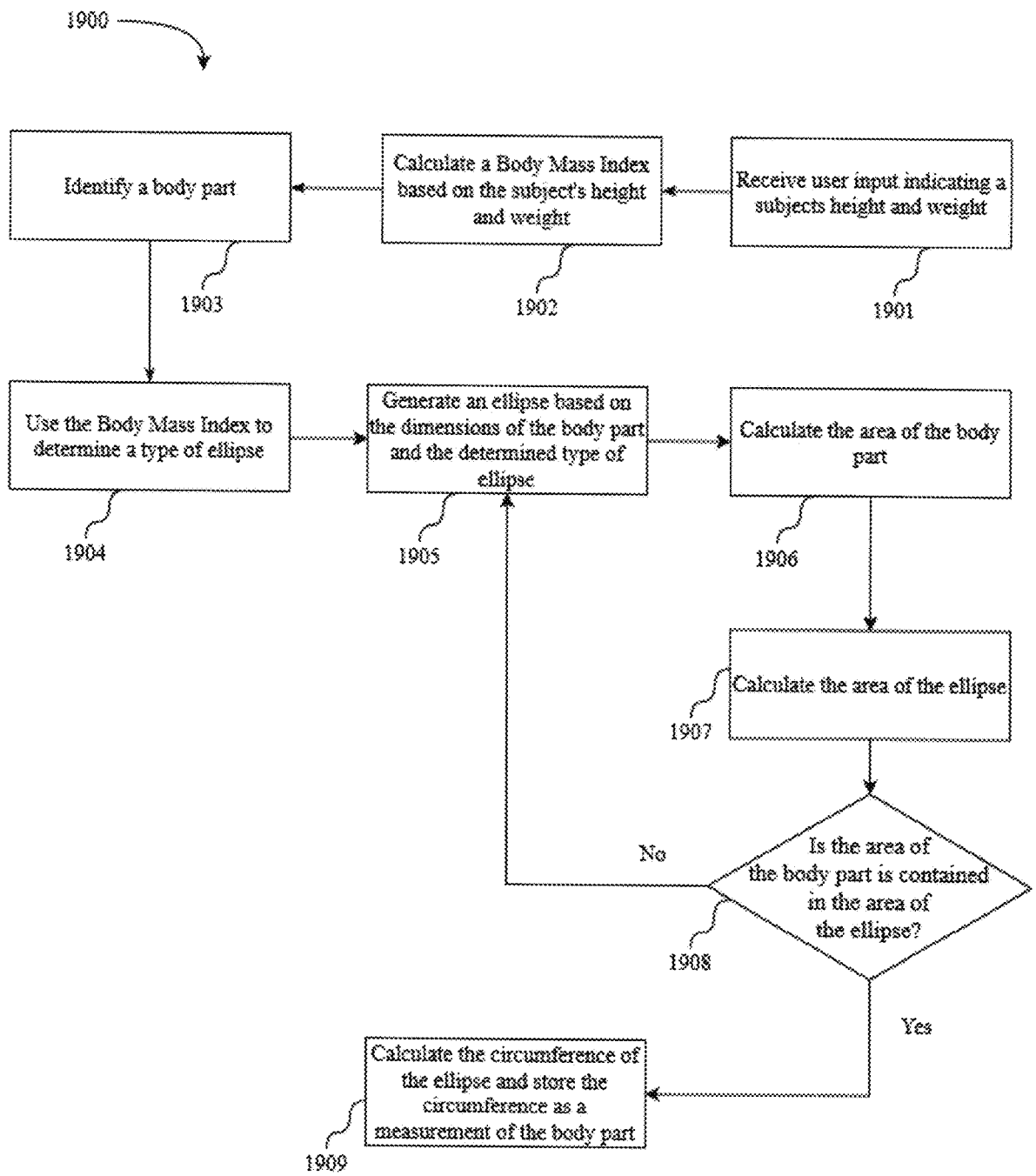
FIG. 19 is a flow diagram depicting a process to use stored ellipse data to assist in measuring a subject used by the system to select wearable items in some embodiments.

FIG. 19 is a flow diagram depicting a process to use stored ellipse data to assist in measuring a subject 1900 used by the system to select wearable items in some embodiments. At act 1901, a user inputs information indicating a subject's height and weight. At act 1902, a Body Mass Index is calculated based on the subject's height and weight. At act 1903, the system to wearable items identifies a body part in a similar manner to act 1701.

At act 1904, the Body Mass Index is used to determine the type of ellipse. In some embodiments, the Body Mass Index is used to determine if the subject has a thin, medium, or large body type, by comparing the Body Mass Index to a pre-defined range of values each indicating a body type, and a corresponding ellipse is selected. In some embodiments, the subject's body type is compared to the body type of previous subjects whose data has undergone the process described in FIG. 18, and an ellipse is chosen based on that comparison. In some embodiments, when the subject's body type is compared to the body type of previous subjects, an ellipse is selected based on the most common type of ellipse used for subjects with similar body types. Acts 1905-1909 then proceed in the same manner as acts 1702-1706.

In some embodiments, the system to select wearable items obtains the subject's temperature. In some embodiments, the mobile device includes, or communicates with, peripheral devices used to measure the temperature of the subject, such as thermometers, thermal imaging devices, etc. In some embodiments, the system to select wearable items obtains the subject's temperature through user input.

In some embodiments, the system to select wearable items obtains the subject's weight. In some embodiments, the mobile device obtains the subject's weight via user input. In some embodiments, the platform includes a scale and the mobile device obtains the subject's weight via user input. In some embodiments, the mobile device obtains the subject's weight by receiving data through a wired, or wireless, connection to a scale included in the platform.

In some embodiments, when the system to select wearable items measures a subject at a time after the subject has already been measured, the system to select wearable items determines whether the subject's spatial dimensions have changed from the subject's previous measurements. In some embodiments, when the system to select wearable items determines that the subject's spatial dimensions have changed from the previous measurements, the system to select wearable items determines the rate of change of the subject's measurements by utilizing the subject's current measurements, previous measurements, and the time between measurements. In some embodiments, the system to select wearable items utilizes the determined rate of change to predict when the subject will need new wearable items, when the wearable items will no longer fit the subject, which wearable items will fit the subject after a certain amount of time has passed, etc.

While particular elements, embodiments, and applications of the system to select wearable items have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A non-transitory computer readable medium storing contents configured to cause a computing device to perform a method for selecting a wearable item, the method comprising:
   a mobile device, the mobile device being configured to obtain image data depicting a subject;
   a server configured to receive the image data depicting the subject from the mobile device;
   the server being further configured to:
      obtain one or more spatial dimensions describing the subject based on the image data depicting the subject; and
      access data describing a wearable item, the data describing a wearable item including one or more spatial dimensions describing the wearable item,
      create on or more ellipses by using the one or more spatial dimensions describing the subject; and
      use the one or more ellipses to determine whether the wearable item fits the subject by comparing the circumference, minor axis, and major axis of the one or more ellipses to the one or more spatial dimensions of the wearable item.

2. The non-transitory computer-readable medium of claim 1, wherein the method further comprises determining whether the wearable item fits the subject.

3. The non-transitory computer-readable medium of claim 2, wherein the method further comprises transmitting the determination of whether the wearable item fits the subject to a second computing device.

4. The non-transitory computer-readable medium of claim 2, wherein determining whether the wearable item fits the subject further comprises comparing the spatial dimensions data describing the subject to the spatial dimensions data describing the wearable item.

5. The non-transitory computer-readable medium of claim 2, wherein the method further comprises:
   obtaining second image data describing the subject;
      measuring the subject based on the obtained second image data to obtain second one or more spatial dimensions describing the subject; and
   determining the change in spatial dimensions of the subject by comparing the one or more spatial dimensions describing the subject to the second one or more spatial dimensions describing the subject.

6. The non-transitory computer-readable medium of claim 5, wherein the method further comprises:
   obtaining data describing the time between measurements;
   determining a rate of change in spatial dimensions of the subject based on the time between measurements and the change in spatial dimensions; and
   determining whether the wearable item will fit the subject after a predetermined time period based on the second one or more spatial dimensions and the rate of change in spatial dimensions of the subject.

7. The non-transitory computer-readable medium of claim 1, the method further comprising:
   obtaining data describing the subject's body type;
   obtaining second image data describing a second subject;
   obtaining data describing the second subject's body type;

measuring the second subject based on the obtained second image data to obtain one or more spatial dimensions describing the second subject;

creating second one or more ellipses by using the one or more spatial dimensions describing the second subject;

creating second one or more ellipses by using the one or more spatial dimensions describing the second subject, the data describing the subject's body type, and the one or more ellipses; and determining whether the wearable item fits the second subject by comparing the circumference of the second one or more ellipses to the one or more spatial dimensions of the wearable item.

8. The non-transitory computer-readable medium of claim 1, wherein the data describing a wearable item is included in a list of wearable items.

9. The non-transitory computer-readable medium of claim 8, wherein the method further comprises:

generating a list of compatible items by determining whether each of the wearable items stored in the list of wearable items fits the subject by comparing the spatial dimensions data describing the subject to the spatial dimensions data describing each of the wearable items stored in the list of wearable items.

10. The non-transitory computer-readable medium of claim 1, further comprising obtaining data describing the subject's body type, the data describing the subject's body type including the subject's weight.

11. The non-transitory computer-readable medium of claim 1, further comprising obtaining data describing the subject's temperature.

12. A system for selecting a wearable item, the system comprising:

a mobile device, the mobile device being configured to obtain image data depicting a subject;

a server configured to receive the image data depicting the subject from the mobile device;

the server being further configured to:

obtain one or more spatial dimensions describing the subject based on the image data depicting the subject;

access data describing a wearable item, the data describing a wearable item including one or more spatial dimensions describing the wearable item;

create one or more ellipses by using the one or more spatial dimensions describing the subject; and determine whether the wearable item fits the subject by comparing the circumference, minor axis, and major axis of the one or more ellipses to the one or more spatial dimensions of the wearable item.

13. The system of claim 12, the server being further configured to determine whether the wearable item fits the subject.

14. The system of claim 13, wherein determining whether the wearable item fits the subject further comprises comparing the spatial dimensions data describing the subject to the spatial dimensions data describing the wearable item.

15. The system of claim 13, wherein the server is further configured to transmit the determination of whether the wearable item fits the subject to a computing device.

16. The system of claim 13, the system further comprising:

the mobile device being further configured to:

obtain second image data describing the subject; and the server being further configured to:

obtain second one or more spatial dimensions describing the subject based on the second image data; and obtain the change in spatial dimensions of the subject by comparing the one or more spatial dimensions describing the subject to the second one or more spatial dimensions describing the subject.

17. The system of claim 12, the system further comprising: the mobile device being further configured to:

obtain data describing the subject's body type;

obtain second image data describing a second subject; and obtain data describing the second subject's body type; and the server being further configured to:

obtain one or more spatial dimensions describing the second subject based on the obtained second image data;

create second one or more ellipses by using the one or more spatial dimensions describing the second subject, the data describing the subject's body type, and the one or more ellipses; and determine whether the wearable item fits the second subject by comparing the circumference of the second one or more ellipses to the one or more spatial dimensions of the wearable item.

18. The system of claim 12, wherein the data describing a wearable item is included in a list of wearable items.

19. The system of claim 18, wherein the server is further configured to:

determine whether each of the wearable items stored in the list of wearable items fits the subject by comparing the spatial dimensions data describing the subject to the spatial dimensions data describing each of the wearable items stored in the list of wearable items; and store each wearable item that fits the subject in a list of compatible items.

20. The system of claim 12, the mobile device being further configured to obtain data describing the subject's body type, the data describing the subject's body type including the subject's weight.

21. The system of claim 12, the mobile device being further configured to obtain data describing the subject's temperature.

22. The system of claim 12, wherein the server is further configured to:

obtain data describing the time between measurements;

determine a rate of change in spatial dimensions of the subject based on the time between measurements and the change in spatial dimensions; and determine whether the wearable item will fit the subject after a predetermined time period based on the second one or more spatial dimensions and the rate of change in spatial dimensions of the subject.

23. One or more storage devices collectively storing a measurement data structure, the data structure comprising:

information specifying one or more ellipses;

information specifying image data depicting a subject; and information specifying a wearable item, such that the information specifying image data is usable to determine spatial dimensions describing the subject;

such that the information specifying the wearable item is usable to be compared to the spatial dimensions describing the subject to determine whether the wearable item fits the subject, and such that the information specifying one or more ellipses, the spatial dimensions, and the information specifying wearable item are usable to determine whether the wearable item fits the subject.

24. The one or more storage devices of claim 23, wherein the data structure further comprises:

information specifying the subject's body type;

information specifying second image data depicting a second subject; and information specifying the second subject's body type, such that the information specifying second image data, the information specifying one or more ellipses, and the spatial dimensions are usable to determine second spatial dimensions and second one or more ellipses describing the second subject, such that the second spatial dimensions and the second one or more ellipses are usable to be compared to the information specifying a wearable item and determine whether the wearable item fits the subject.

25. The one or more storage devices of claim 23, wherein the data structure further comprises:

information specifying second image data depicting the subject, such that the second image data depicting the subject is usable to determine second spatial dimensions describing the subject, and such that the spatial dimensions data and the second spatial dimensions data are usable to predict whether the wearable item will fit the subject after a predetermined period of time.

26. The one or more storage devices of claim 23, wherein the data structure further comprises information specifying the subject's weight.

27. The one or more storage devices of claim 23, wherein the data structure further comprises information describing one or more wearable items.

\* \* \* \* \*